US007137105B2

(12) United States Patent
Madsen et al.

(10) Patent No.: US 7,137,105 B2
(45) Date of Patent: *Nov. 14, 2006

(54) DYNAMIC SOFTWARE CODE INSTRUMENTATION METHOD AND SYSTEM

(75) Inventors: Kenneth E. Madsen, Mendon, MA (US); Dersang Lee, Mansfield, MA (US); Peter S. Dawson, Canton, MA (US)

(73) Assignee: Wind River Systems, Inc., Alameda, CA (US)

( * ) Notice: Subject to any disclaimer, the term of this patent is extended or adjusted under 35 U.S.C. 154(b) by 905 days.

This patent is subject to a terminal disclaimer.

(21) Appl. No.: 09/813,522

(22) Filed: Mar. 21, 2001

(65) Prior Publication Data

US 2003/0204374 A1 Oct. 30, 2003

Related U.S. Application Data

(63) Continuation-in-part of application No. 09/310,441, filed on May 12, 1999, now Pat. No. 6,397,382.

(51) Int. Cl.
*G06F 9/44* (2006.01)
*G06F 11/00* (2006.01)
(52) U.S. Cl. .................. 717/128; 717/127; 717/130; 714/38; 714/45
(58) Field of Classification Search ................ 717/128, 717/127, 130; 714/38, 45
See application file for complete search history.

(56) References Cited

U.S. PATENT DOCUMENTS

| | | | |
|---|---|---|---|
| 5,212,794 A | 5/1993 | Pettis et al. | |
| 5,274,811 A * | 12/1993 | Borg et al. | ................. 717/128 |
| 5,313,608 A | 5/1994 | Takai | |
| 5,493,664 A | 2/1996 | Doi | |
| 5,528,753 A * | 6/1996 | Fortin | ......................... 714/38 |
| 5,530,804 A | 6/1996 | Edgington et al. | |
| 5,560,036 A | 9/1996 | Yoshida | |
| 5,561,761 A | 10/1996 | Hicok et al. | |
| 5,581,695 A | 12/1996 | Knoke et al. | |
| 5,664,191 A * | 9/1997 | Davidson et al. | ........... 711/170 |
| 5,689,712 A * | 11/1997 | Heisch | ........................ 717/131 |
| 5,737,516 A | 4/1998 | Circello et al. | |
| 5,748,878 A | 5/1998 | Rees et al. | |

(Continued)

FOREIGN PATENT DOCUMENTS

EP 0569987 A1 11/1993

(Continued)

OTHER PUBLICATIONS

C. D. Rose, J. K. Flanagan, "Constructing Instruction Traces from Cache-Filtered Address Traces (CITCAT)", 1996, ACM, p. 1-8.*

(Continued)

*Primary Examiner*—Wei Zhen
*Assistant Examiner*—Qamrun Nahar
(74) *Attorney, Agent, or Firm*—Fay Kaplun & Marcin, LLP

(57) ABSTRACT

A method and system of monitoring code after being compiled or assembled is provided. Software code instructions, such as a function preamble and/or a data manipulation instruction, are identified using debug information and then dynamically replaced with an instruction that will branch execution to a scratchpad buffer. A routine is inserted into the scratchpad buffer, and includes instruction(s) to generate output to a trace buffer. Subsequent instructions in the scratchpad may execute the replaced instruction(s) and branch back to the address of the program code immediately following the original address of the replaced instruction.

48 Claims, 15 Drawing Sheets

U.S. PATENT DOCUMENTS

| | | | | |
|---|---|---|---|---|
| 5,764,885 | A * | 6/1998 | Sites et al. | 714/45 |
| 5,900,014 | A * | 5/1999 | Bennett | 717/127 |
| 5,944,841 | A * | 8/1999 | Christie | 714/38 |
| 5,953,530 | A * | 9/1999 | Rishi et al. | 717/127 |
| 5,996,092 | A * | 11/1999 | Augsburg et al. | 714/38 |
| 6,026,236 | A * | 2/2000 | Fortin et al. | 717/130 |
| 6,223,338 | B1 * | 4/2001 | Smolders | 717/128 |
| 6,233,678 | B1 * | 5/2001 | Bala | 712/240 |
| 6,351,844 | B1 * | 2/2002 | Bala | 717/128 |
| 6,668,372 | B1 * | 12/2003 | Wu | 717/130 |

FOREIGN PATENT DOCUMENTS

| | | | | |
|---|---|---|---|---|
| EP | 000569987 A1 * | 11/1993 | | 714/45 |
| EP | 0657812 A1 | 6/1995 | | |

OTHER PUBLICATIONS

B. Cmelik, D. Keppel, "Shade: A Fast Instruction-Set Simulator for Execution Profiling", 1994, ACM, p. 128-137.*

Marsh D: "Smart tools ILLUMINATE deeply embedded systems" EDN Europe, Feb. 2000, Cahners Publishing USA, p. 128-138.

Cannon W J et al: "Real time, nonintrusive instrumentation of reduced instruction set computer (RISC) microprocessors" Proceedings Of The National Aerospace And Electronics Conference. (NAECON). Dayton, May 18-22, 1992, pp. 550-557.

Hollingsworth J K et al: "MDL: a language and compiler for dynamic program instrumentation" Proceedings. 199 International Conference On Parallel Architectures And Compilation Techniques (CAT. No. 97TB100161); Proceedings 1997 International Conference On Parallel Architectures And Compilation Techniques, San Francisco, CA, USA, 10=14 Nov. 1, pp. 201-212.

Hollingsworth et al., "MDL: A Language and Compiler for Dynamic Program Instrumentation," Proceedings, 1997 International Conference on Parallel Architectures and Compilation Techniques, pp. 201-212.

* cited by examiner

FIG. 5

| ISAADDR | OPCODE | DIS | | CLOCK/A | EVENT |
|---|---|---|---|---|---|
| | 500 | 000004e8 | 9421FFE8 | (MARK) STWU | R1,-0x0018(R1) |
| 60: | | date.c\date | | | |
| | 498' | 000004e8 | 9421FFE8 | (MISS) STWU | R1,-0x0018(R1) |
| | 498' | 000004ec | 7C0802A6 | (MISS) MFSPR | R0,1r |
| | 494' | 000004f0 | 93A1000C | (MISS) STW | R29,0x000c(R1) |
| | 494' | 000004f4 | 93C10010 | (MISS) STW | R30,0x0010(R1) |
| | 492 | 0000c758 | 0000C770 | (WRITE) | |
| | 488' | 000004f8 | 93E10014 | (MISS) STW | R31,-0x0014(R1) |
| | 488' | 000004fc | 9001001C | (MISS) STW | R0,0x001c(R1) |
| | 486 | 0000c764 | 93E10014 | (WRITE) | ⎫ |
| | 402 | 0000c768 | 00000006 | (WRITE) | ⎬ 53 |
| | 478 | 0000c76c | 00000041 | (WRITE) | ⎭ |
| | 474 | 0000c774 | 00000005 | (WRITE) | |

47 →

TRACE DISPLAY COMPLETE
DISPLAY TRACE | FROM# 0 | TO# 500
INSTRUCTION CACHE TOGGLE DISABLED | DATA CACHE TOGGLE DISABLED | IN MIXED MODE ▼ | MORE | NEW Win | NET TIME

>BKM> | OFFLINE | LEVEL 0 | VTE | NO TRACE ACQUISITION | 016384 NEW | NO LAST EVENT

| Display | ◇ | FROM # 0 | TO # 500 | in Function Mode ▾ | More | NEW Win | Net Time | 0.36 μsec |

INSTRUCTION CACHE TOGGLE [DISABLED]   DATA CACHE TOGGLE [ENABLED]

```
...calendar.c\dayOfYear                                                           0.88 μsec
        .......strutils.c\strcmp            44                                    2.56 μsec
...calendar.c\dayOfYear                                                           2.56 μsec
        .......strutils.c\strcmp                                                  8.32 μsec
...calendar.c\dayOfYear                                                           3.24 μsec
...calendar.c\daysBetween                                                         0.36 μsec
297:    dayNum1 = dayOfYear( firstDate );                                         0.36 μsec
298:    dayNum2 = dayOfYear( secondDate );                                        0.36 μsec
...calendar.c\dayOfYear  ── 62                                                    2.72 μsec
185: (                                                                            0.84 μsec
192:    if ( year1997.initId != INITIALIZED )                                     0.36 μsec
193:        return -1;                                                            0.16 μsec
199:    for ( n=0, daySum=0; n < TWELVE_MONTHS ;n++ )                             0.64 μsec
206:        status = strcmp( monthDate->monthName, year1997.month[n].monthName );
206:        status = strcmp( monthDate->monthName, year1997.month[n].monthName );
        .......strutils.c\strcmp                                                  2.56 μsec
50: (                                                                             0.84 μsec
51:     while ((*s1 == *s2) && *s1) (                                             0.64 μsec
56:     return (*s1 - *s2);                                                       0.36 μsec
57: )                                                                             0.72 μsec
...calendar.c\dayOfYear                                                           2.56 μsec
        .......strutils.c\strcmp                                                  2.6 μsec
...calendar.c\dayOfYear                                                           2.56 μsec
        .......strutils.c\strcmp                                                  2.52 μsec
```

| > BKM > | OFFLINE | LEVEL 0 | VTE | NO TRACE ACQUISITION | 016384 NEW | NO LAST EVENT |

DYNAMIC SOFTWARE CODE INSTRUMENTATION METHOD AND SYSTEM

RELATED APPLICATION

This application is a continuation-in-part of U.S. patent application Ser. No. 09/310,441, entitled Dynamic Software Code Instrumentation Method and System, filed May 12, 1999 now U.S. Pat. No. 6,397,382.

BACKGROUND OF THE INVENTION

1. Field of the Invention

This invention relates to software analysis, and more particularly to a method and apparatus for dynamically instrumenting software executing on embedded systems for analysis thereof.

2. Background Information

A wide variety of hardware and/or software systems for generating an exception to debug, test and/or emulate a target processor are known in the art. Such systems provide their functionality using many disparate technologies.

For example, U.S. Pat. No. 5,560,036 to Yoshida; U.S. Pat. No. 5,737,516 to Circello et al.; U.S. Pat. No. 5,530,804 to Edgington et al., (the '804 patent); and U.S. Pat. No. 5,493,664 to Doi, all disclose processors having hardware or software integrated therein which facilitates debugging. A drawback of these approaches, however, is that they are not readily usable in connection with processors not originally manufactured with integrated debugging capabilities. For example, The '804 patent discloses a processor having two modes of operation, one being a normal mode and the other being a debug, test or emulator mode of operation which is entered via an exception/interrupt. In this approach, a 'generate debug mode exception' (GDMI) may be included in the processor's instruction set. Disadvantageously, this approach is integrated into the processor rather than being suitable for use with processors not originally manufactured with such integrated systems.

U.S. Pat. No. 5,748,878 to Rees et al., (the '878 patent) discloses a software analysis system for capturing tags generated by tag statements in instrumented source code. This software analysis system includes a probe that monitors the address and data bus of the target system. When a tag statement is executed in the target system, a tag is written to a predetermined location in the address space of the target system. In this manner, instructions executing from internal cache memory which are not reflected on externally accessible buses, may be monitored. A drawback of this approach, however, is that discrete tag statements, which tend to disadvantageously increase the number of executable lines of the code, must be included within the source code. These discrete tags disadvantageously increase the size of the code in proportion to the number of functions instrumented. Moreover, although the tags may be monitored, the code continues to be executed within cache, and thus is not directly observable.

Thus, a need exists for an improved debugging/emulation system capable of overcoming drawbacks of the prior art.

SUMMARY OF THE INVENTION

According to an embodiment of this invention, a method is provided for monitoring run time execution of software code in a target system. The method includes searching a range of addresses within the software code to identify a desired instruction. Additional aspects of this method include replacing the desired instruction with a program flow change instruction directing execution to a buffer. Further aspects include: inserting a routine into the buffer, the routine having an output instruction and a branch instruction branching to an address of the software code subsequent to the program flow change instruction; and executing the program code.

Another embodiment of the present invention includes a system for monitoring run time execution of software code in a target. The system includes an instruction locating module to search a range of addresses within the software code to identify a desired instruction, and an instruction replacement module to replace the desired instruction with a program flow change instruction directing execution to a buffer. The system also includes an instrumentation module to insert a routine into the buffer, the routine having an output instruction and a branch instruction branching to an address of the software code subsequent to the program flow change instruction.

In a still further embodiment, the present invention includes an article of manufacture for monitoring run time execution of software code in a target system. The article of manufacture includes a computer usable medium having computer readable program code embodied therein. The computer usable medium has computer readable program code for searching a range of addresses within the software code to identify a desired instruction, and has computer readable program code for replacing the desired instruction with a program flow change instruction directing execution to a buffer. The computer usable medium also includes computer readable program code for inserting a routine into the buffer, the routine having an output instruction and a branch instruction branching to an address of the software code subsequent to the program flow change instruction.

Another embodiment of this invention includes computer readable program code for monitoring run time execution of software code in a target system. The computer readable program code includes computer readable program code for searching a range of addresses within the software code to identify a desired instruction, and for replacing the desired instruction with a program flow change instruction directing execution to a buffer. Computer readable program code is also included for inserting a routine into the buffer, the routine having an output instruction and a branch instruction branching to an address of the software code subsequent to the program flow change instruction.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 5 is a screen display showing results of the operation of an embodiment of the present invention;

FIG. 8 is a screen display of results of the operation of an embodiment of the present invention shown in FIG. 7;

FIG. 10 is a screen display of the results of the operation of an embodiment of the present invention shown in FIG. 9;

DETAILED DESCRIPTION OF THE PREFERRED EMBODIMENTS

Figure 1:
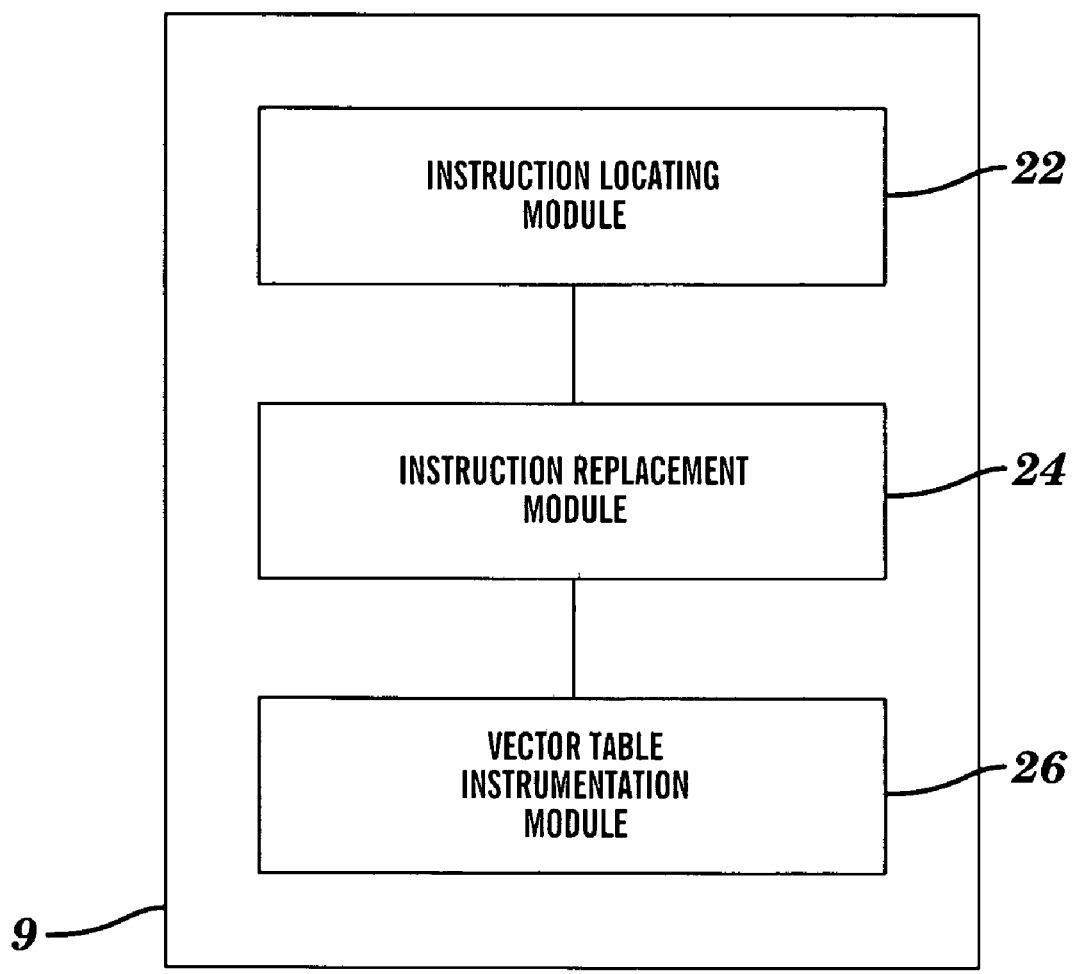
FIG. 1 is a block diagram/flow chart of an example of the code monitoring system of the present invention.

Referring to the figures set forth in the accompanying Drawings, the illustrative embodiments of the present invention will be described in detail hereinbelow. For clarity of exposition, corresponding or analogous features shown in the accompanying drawings shall be indicated with like reference numerals and similar features such as shown in alternate embodiments in the drawings shall be indicated with similar reference numerals.

Figure 2:
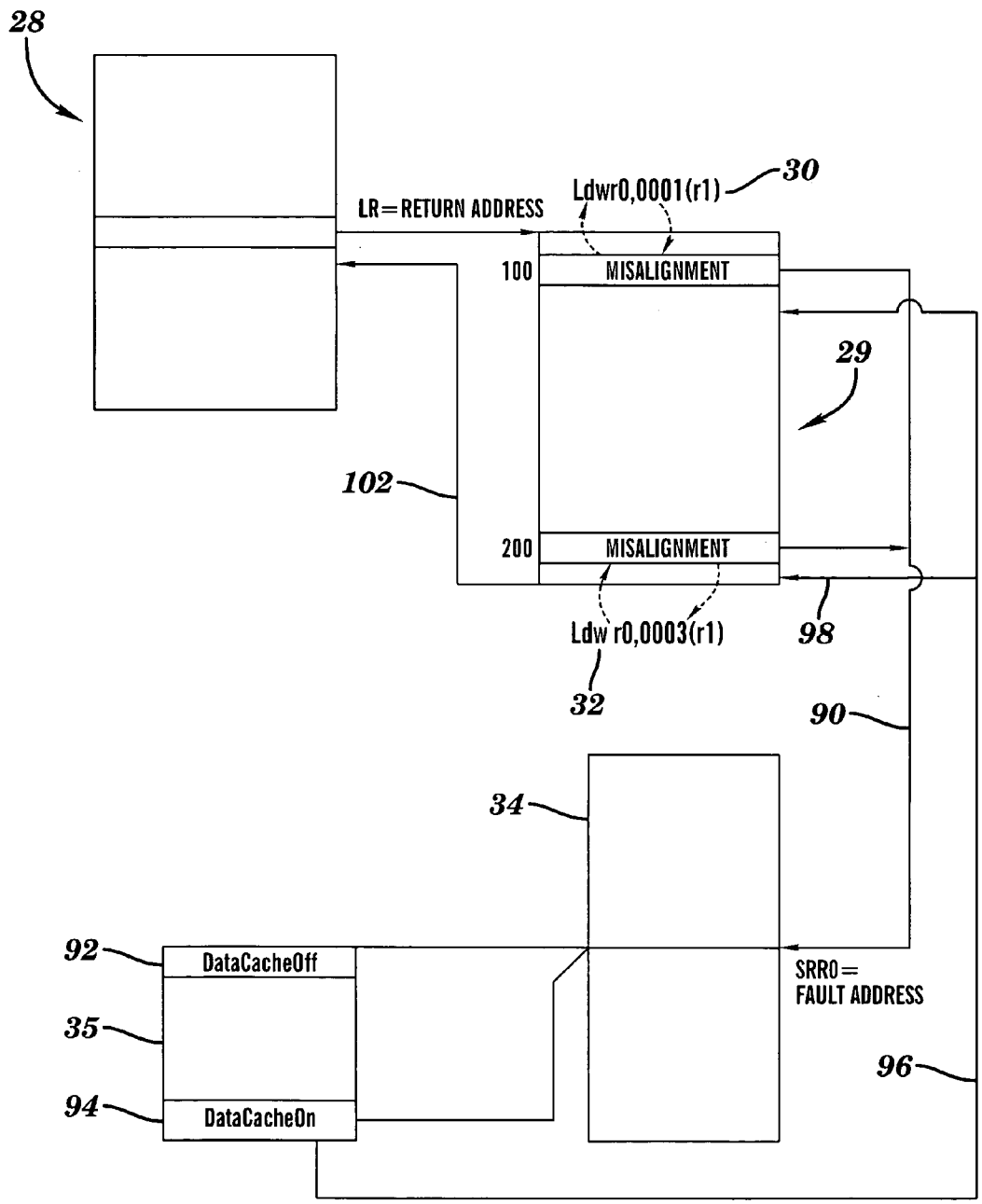
FIG. 2 is a block diagram/flow chart of an example of operations performed by the code monitoring system of FIG. 1.

Briefly described, as best shown in FIG. 2, an embodiment of the present invention includes a system and method of monitoring software code as it is executed by a target CPU for debugging, etc. Standardized software code function (or module) preamble and postamble instructions such as shown at 30 and 32 are dynamically replaced (i.e., replaced after compiling and prior to execution) with instructions that will generate a predetermined exception or interrupt. This exception is of a type included in the standard instruction set of the target processor, such as a misalignment exception. The exception thus generates a branch 90 to a conventional exception vector table 34. An exception routine 35 is inserted into the vector table, which may include any of several instructions, such as disabling the Data Cache (as at 92) and/or Instruction Cache. Subsequent instructions in the vector table execute the replaced preamble instruction and then, with or without re-enabling the cache as at 94, branch back to an address of the program code module immediately following the faulted preamble address as shown at 96. Instructions of the function 29 executed while cache is disabled are executed on the bus where they are visible, as opposed to within cache. The function 29 continues to execute until the substitute postamble instruction 32 generates a second misalignment exception. This second exception will branch the program (as at 90) back to the exception table 34 which executes as discussed hereinabove and then re-enables the cache at 94. At this point, the vector table 34 branches back to an address of the program code immediately following the faulted postamble instruction as shown at 98 and then to the calling function 28 as shown at 102 to enable the remainder of the program to run in a normal, full speed (cache-enabled) fashion.

Advantageously, embodiments of the present invention provide the flexibility to selectively instrument various portions of the code at run time, to avoid having to execute previously debugged code at the less than optimum levels of performance typically associated with disabled cache. Moreover, an embodiment of the present invention enables such instrumentation nominally without "padding" the individual code functions with additional instructions. Rather, the functionality of an embodiment of the present invention is provided by adding instructions only to the exception vector table 34. Thus, multiple software functions or modules may be instrumented nominally without any more overhead (i.e., added instructions) than that associated with instrumenting a single function.

Referring to the Figures, embodiments of the present invention will now be described in greater detail. As shown in FIG. 1, the invention includes an instrumentation block 9 which further includes an instruction locating module 22 coupled to an instruction replacement module 24 which is in turn coupled to a vector table instrumentation module 26. Instruction locating module 22 scans a block of program code within a user designated address range or ranges to locate predetermined instructions. Examples of such predetermined instructions include those used to designate a preamble and/or a postamble of a code block or function. Once the preamble and/or postamble of the code block has been located, instruction replacement module 24 replaces the instructions with substitute instructions designed to generate an exception of a type commonly included in the instruction set of the target microprocessor. An example of such an exception is a misalignment exception which occurs when the processor attempts to read from an odd numbered address. Although embodiments of the present invention are described herein with respect to misalignment exceptions, it should be understood by those skilled in the art that other types of standard exceptions may be utilized without departing from the spirit and scope of the present invention.

The vector table instrumentation module 26 serves to instrument (add instructions to) the standard exception vector table by inserting an exception routine 35 (FIG. 2) therein, as will be discussed in greater detail hereinbelow.

Turning now to FIG. 2, an example of the operation of an embodiment of the present invention is shown. Initially, instruction locating module 22 utilizes conventional searching techniques to locate standard EABI (Embedded Application Binary Interface) preamble and postamble instructions which occur at the beginning and ending, respectively, of a function. In particular, the invention may search for the MFSPR (move from special register) instruction which occurs in the preamble and the MTSPR (move to special register) instruction which occurs in the postamble of each function. These instructions are preferably chosen because they are standard EABI commands present in any software intended to be compliant with a number of platforms, including Motorola® PowerPC™, other Motorola® platforms, and Internet compatible platforms. The MFSPR and MTSPR instructions are thus included in the standard instruction set for nominally all EABI compatible processors.

For example, an 'MFSPR r0, 1r' instruction (not shown) originally located at address 100 of instrumented function 29 instructs the processor to take the address in a link register of main program 28 (i.e., the calling function) and insert it into the r0 register, while an 'MTSPR 1r, r0' instruction (not shown) at address 200 of function 29 instructs the processor to take the value in the r0 register and insert it back into the link register. In operation, the user may select an address range to be searched, to for example, search for functions disposed within, or called by instructions within, the range of adresses, i.e., between 0 and 300. Once the preamble and postamble instructions have been found by the instruction locating module 22, instruction replacement module 24 replaces them with substitute instructions to generate misalignment exceptions. Examples of misalignment instructions and their codes are shown in the following Table 1:

TABLE 1

| | Replacement Instruction | Decoded Meaning | Instruction Replaced | Action for Exception Routine |
|---|---|---|---|---|
| 30 | Ldw r0,0001(r1) | = entry to a function | MFSPR r0,1r | create entry marker only |
| 31 | Ldw r0,0011(r1) | = entry to a function and turn I-Cache off | MFSPR r0,1r | create entry marker and turn Instruction Cache off (to begin trace) |
| 37 | Ldw r0,0021(r1) | = entry to a function and turn I-Cache on | MFSPR r0,1r | create entry marker and turn Instruction Cache on (to end trace) |
| 32 | Ldw r0,4001(r1) | = exit from a function | MTSPR 1r,r0 | create exit marker only |
| 39 | Ldw r0,4011(r1) | = exit from a function and turn I-Cache off | MTSPR 1r,r0 | create exit marker and turn Instruction Cache off (to begin trace) |
| 33 | Ldw r0,4021(r1) | = exit from a function and turn I-Cache on | MTSPR 1r,r0 | create exit marker and turn Instruction Cache on (to end trace) |

In the example shown in FIG. 2, the preamble and postamble instructions are replaced with substitute instructions 30 and 32, respectively. Instruction 30 effectively instructs the processor to increment the value in the r1 register by one and insert it into the r0 register.

In this regard, the skilled artisan will recognize that to be fetched properly, the value of the address in the r1 register should be an even number. Moreover, in PowerPC™ architecture the processor may only fetch from even numbered addresses in increments of eight. By inserting command 30, the processor will attempt to read from an odd-numbered address and thus generate a misalignment exception. The processor will then branch to the exception vector table 34. Once at vector table 34, the processor will execute the exception routine 35 inserted by the instrumentation module 26 (FIG. 1).

A preferred embodiment of the exception routine 35 is generally described in the following Table 2:

TABLE 2

| 1. | Save current state of Data Cache and then Disable Data Cache |
|---|---|
| 2. | Read from start of exception routine |
| 3. | Read address of misalignment exception (in SRR0 Register) |
| 4. | Read Opcode which caused exception |

TABLE 2-continued

| 5. | Decode misalignment exception |
|---|---|
| | a. if ldw r0,0001(r1) then read link register, execute MFSPR R0,LR, goto step 6 |
| | b. if ldw r0,0011(r1) then read link register, turn I-Cache off, execute MFSPR R0,LR, goto step 6 |
| | c. if ldw r0,0021(r1) then read link register, turn I-Cache on, execute MFSPR r0,LR, goto step 6 |
| | d. if ldw r0,4001(r1) execute MTSPR LR,R0, goto step 6 |
| | e. if ldw r0,4011(r1) then turn I-Cache off, execute MTSPR LR,r0, goto step 6 |
| | f. if ldw r0,4021(r1) then turn I-Cache on, execute MTSPR LR,R0, goto step 6 |
| 6. | Restore original state of Data Cache and then Read from start of exception routine +2 |
| 7. | Enable Data Cache |
| 8. | Return to function at next instruction after exception |

The misalignment instruction causes a fault prior to actual execution thereof. The actual read from an odd address thus does not actually take place. The CPU automatically vectors to the misalignment exception routine 35 and automatically stores the faulted address in a special register, i.e., the "SRR0" register. Referring now to Table 2, after saving the current state of the Data Cache, the first instruction in the exception routine 35 disables the Data Cache as shown at step 1. The subsequent instruction at step 2 directs the processor to read the starting location (i.e., address 602 in the exemplary code listings included hereinbelow) of the exception routine 35 so that this read is visible on the external bus and is thus used to indicate to an external bus/state analyzer that the misalignment exception routine 35 has been entered. In this regard, the instruction will have been pre-fetched by the processor and stored in the Instruction Cache. (One skilled in the art will recognize that in conventional "Harvard" architecture, instruction "fetches" normally occur in Instruction Cache, while "reads" and "writes" will normally occur in Data Cache.) This read of the pre-fetched instruction at the starting location of routine 35 thus serves as a TAG or MARK which informs an external bus/state analyzer to capture the subsequent cycle of instructions being executed. The next step 3 is to read the faulted address stored in the "SRR0" register as shown at 40. The exception routine then reads the data at the location pointed to by the SRR0 register (i.e., the Opcode at the faulted address) as shown at step 4. Since the Data Cache has been previously disabled, the processor executes steps 3 and 4 on the external bus where they are visible by the conventional bus/state analyzer, i.e., an emulator/debugging hardware or software system.

Steps 5a–5f decode the data according to the Opcode which generated the exception, to determine which instruction was originally replaced and to determine what action to take, as indicated in Table 1 hereinabove. For example, if the Opcode includes a hexadecimal value of 0001, as shown in step 5a, this indicates the presence of misalignment exception 30 (Table 1), and according to Table 1, function 29 was entered and only a marker (without a trace) should be generated. (An example of such functionality will be discussed hereinbelow with respect to FIG. 8.) Alternatively, if the Opcode includes a hexadecimal value of 4001, as shown at step 5d, this indicates presence of misalignment exception 32 (Table 1), and that according to Table 1, a function 29 was exited and a marker should be generated.

Various additional instructions may be included in the exception routine 35 to provide additional functionality selectable by the user. For example, provision for decoding instructions 31 and 33 (FIG. 2) may be included as at steps 5b and 5f, to enable a user to instrument for entry and exit of functions and to trace the functions (i.e., view the execution of the functions). Instructions 37 and 39 also may be decoded as at steps 5c and 5e for use in called functions (i.e., children) for which a trace is not desired, as will be discussed in greater detail hereinbelow.

Having decoded the misalignment instruction, steps 5a–5f will execute the original replaced instruction and take any additional appropriate action (i.e., turn Instruction Cache on/off, etc.) as also shown. Once any one of the steps 5a–5f has been completed, the exception routine 35 restores the original state of the Data Cache and then reads the start of the exception routine +2, i.e., address 606 in the exemplary code listings included hereinbelow, as shown at step 6, to indicate to the bus/state analyzer that the exception routine has been exited. The Data Cache is then re-enabled in step 7. Step 8 returns to the instrumented function 29 at the next instruction after the misalignment instruction (i.e., the instruction subsequent to the address in the SRR0 register).

The TAGS or MARKERS provided by steps 2 and 6 discussed hereinabove may be preferably utilized by the external bus/state analyzer to control output displayed by display module 14, in accordance with the triggering arrangement shown in the following Table 3:

TABLE 3

| | Instruction | Decoded Meaning |
|---|---|---|
| 80 | L0.0 if address = 602 then goto L1 | when address read occurring on bus = entry to exception routine (i.e., 602) goto level 1 and look for events L1.0 or L1.1 |
| 82 | L1.0 if read then trace cycle | trace all read cycles while event system is at level 1 |
| 84 | L1.1 if address = 606 then goto L0 | when address read occurring on bus = entry to exception routine +2 (i.e., 606) goto to level 0 and wait for event L0.0 |

The above triggering arrangement signals the external bus/state analyzer when to display the output provided by an embodiment of the present invention. Such a triggering arrangement is particularly useful when the event program code 28 is executing with either or both Data and Instruction Caches disabled prior to entry of exception routine 35. In such an event, since the entire program code 28 may be executing on the bus where it is visible, this triggering arrangement may be advantageously utilized to specifically identify execution of the selected function 29.

Having described an embodiment of the present invention, various functionality thereof will be described. In the event an embodiment of the present invention is configured to indicate only entry and exit of a particular function 29, the exception routine 35 is executed once, utilizing step 5a to indicate entry to the function 29. The exception routine then branches back to the next instruction after the preamble to permit the function 29 to execute in a conventional manner until the misalignment instruction 32 is reached, at which time the exception routine 35 is executed a second time, utilizing step 5d to indicate exit from the function 29. In this event, after indication that the function 29 has been entered, the function 29 will continue to execute in cache until the processor attempts to read the substituted instruction 32 at the postamble. When this occurs, a second misalignment exception is generated at which point the processor branches back to the vector table 34 (and exception routine 35) to provide the user with an indication that the function 29 is being exited by the microprocessor. The routine 35 will then be exited, branching to the instruction subsequent to the postamble of the function 29, followed by restoring the value originally in r0 to the link register to effectively branch the processor back to the main program code (calling function) 28. The calling function 28 will then operate in a conventional, fully cached mode to operate at full efficiency and speed.

Additional functionality, such as providing a trace with or without trace of other functions (i.e., calls or children) called by function 29 may be provided. This may be implemented by using modules 22 and 24 to individually locate any branches to such children, and replace the preambles and postambles of such children, (regardless of whether or not they fall within the address range selected by the user), substantially as described hereinabove. For example, a function 29 (and calls) may be traced by substituting instructions 31 and 33 into function 29 and its children as described hereinabove. Similarly, function 29 may be traced without calls by substituting instructions 31 and 33 into function 29, while substituting instructions 37 and 39 into the preambles and postambles, respectively, of any children of function 29. In this latter example, the Instruction Cache will be enabled upon entry to each of the children to prevent them from being traced, and then disabled upon exit therefrom to continue tracing the parent function 29.

Figure 3:
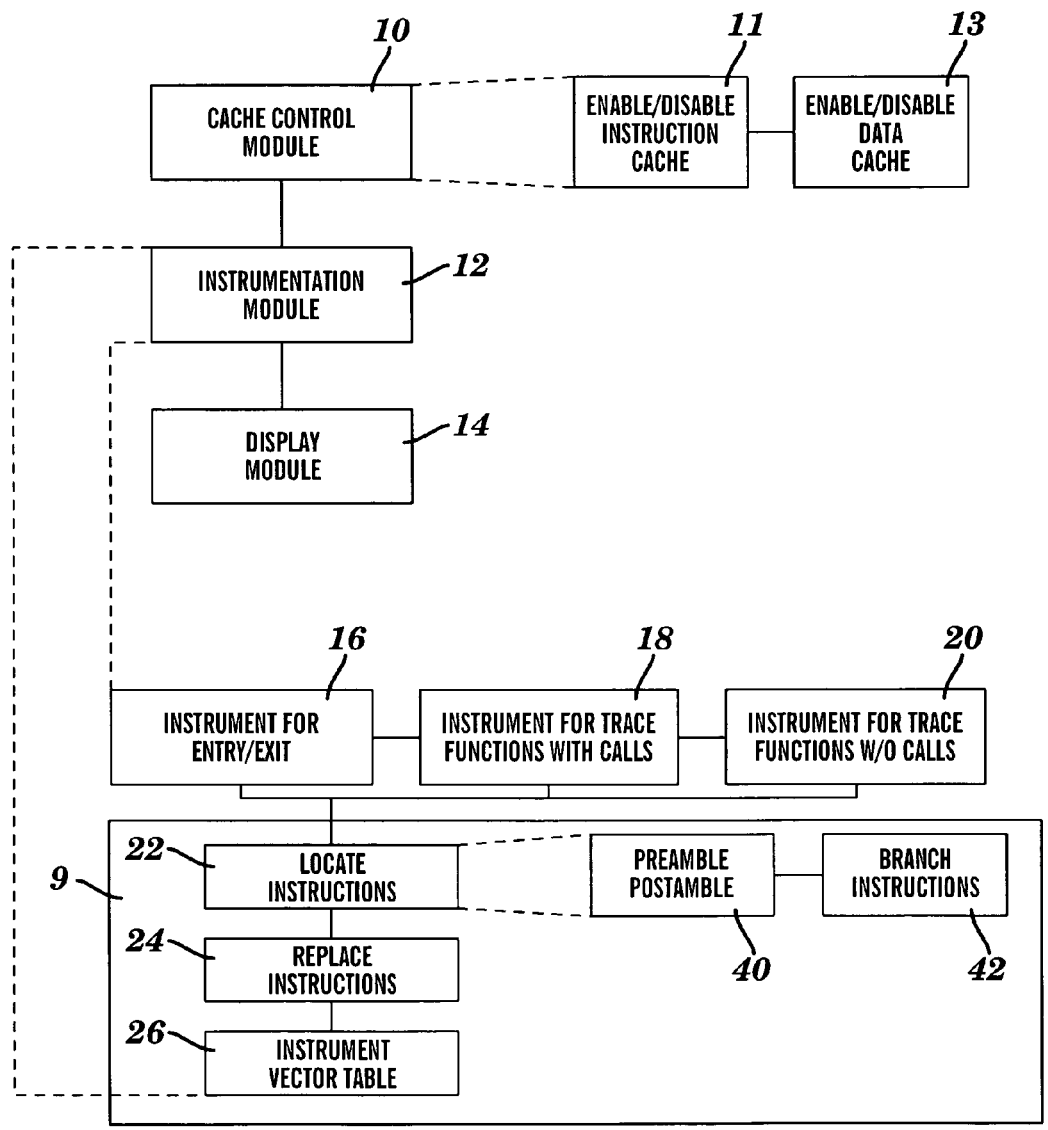
FIG. 3 is an expanded block diagram/flowchart of an embodiment of the present invention including the code monitoring system of FIG. 1.

Turning now to FIG. 3, an embodiment of the present invention is shown and described in block diagram format. As shown, a conventional cache control module 10 may be utilized in combination with an embodiment of the present invention to enable a user to selectively enable or disable Instruction Cache and/or Data Cache as indicated at blocks 11 and 13, respectively. The cache control module 10 is preferably coupled to instrumentation module 12 of an embodiment of the present invention. The instrumentation module preferably includes an Entry/Exit instrumentation module 16, a Trace Functions With Calls module 18 and a Trace Functions Without Calls module 20. Modules (i.e, menu commands) 16, 18 and 20 are individually selectable by a user utilizing a conventional graphical user interface (GUI), as may be provided in Display Module 14 discussed hereinbelow. Each module 16, 18 and 20 is coupled to the instrumentation block 9 which includes modules 22, 24 and 26 as described hereinabove and which operate in a predetermined manner dependent upon which instruction or module 16, 18 and 20 is selected by the user. In this regard, instruction locating module 22 includes a preamble/postamble locating block 40 for locating instructions disposed in the preamble and/or postamble of a function, such as the MFSPR and MTSPR instructions discussed hereinabove. A branch instruction module 42 is also included to locate branch instructions and thus provide the Trace With Calls functionality associated with module 18.

Instrumentation module 12 is coupled to a display module 14 which as mentioned hereinabove, may include a conventional graphical user interface (GUI) to generate screen displays of both the user selectable functions as well as the code executing on the bus of the target processor.

Figure 4:
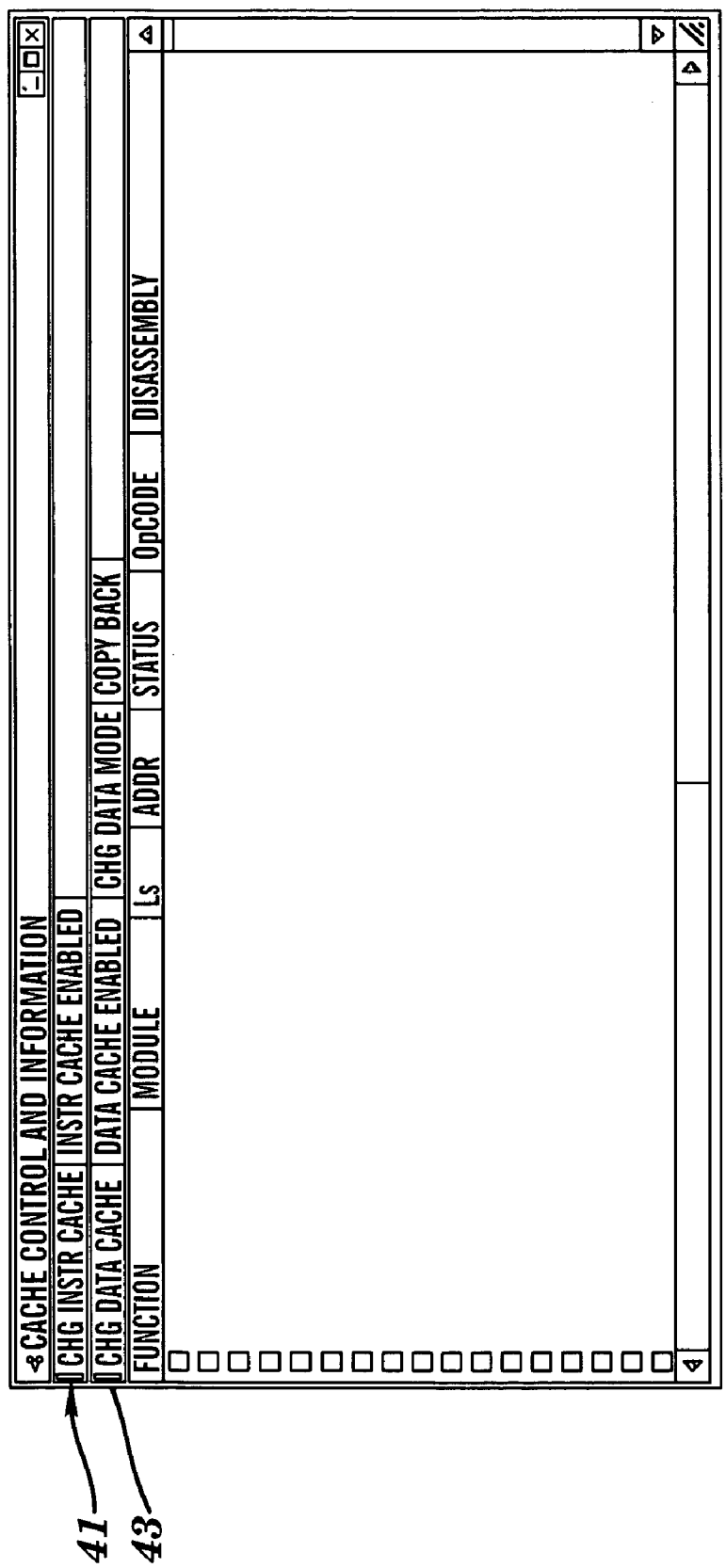
FIG. 4 is a screen display of a step in the operation of an embodiment of the present invention.

As shown in FIG. 4, the cache control module 10 may be operated using a GUI interface generated by display module 14 to either enable or disable Instruction Cache and/or Data Cache using instruction and Data Cache toolbars 41 and 43, respectively. Once disabled, all instruction fetches and/or reads and writes will occur on the bus and thus be displayed as shown, for example, in FIG. 5.

Turning to FIG. 5, both Instruction Cache and Data Cache have been disabled as shown at display line 45. As also shown, instruction fetch cycles occurring on the bus are indicated with a "miss" designation 47 to indicate that cache was missed. Moreover, all read cycles and write cycles are displayed with the words "read" (not shown) or "write" as at 53 when the Data Cache is disabled.

An exemplary embodiment of the present invention having been described, the following is a more detailed description of some of the operations thereof as displayed to a user.

In general, cache may be initially disabled and enabled by invoking cache control module 10 or a similar device as shown in FIG. 4. A user may then operate this embodiment of the present invention by selecting module (menu command) 16, 18, or 20 as will be shown and described with respect to FIGS. 6–11 hereinbelow. The code 28 to be debugged then may be run on the target processor as desired and a trace thereof may be displayed by the display module 14.

Figure 6:
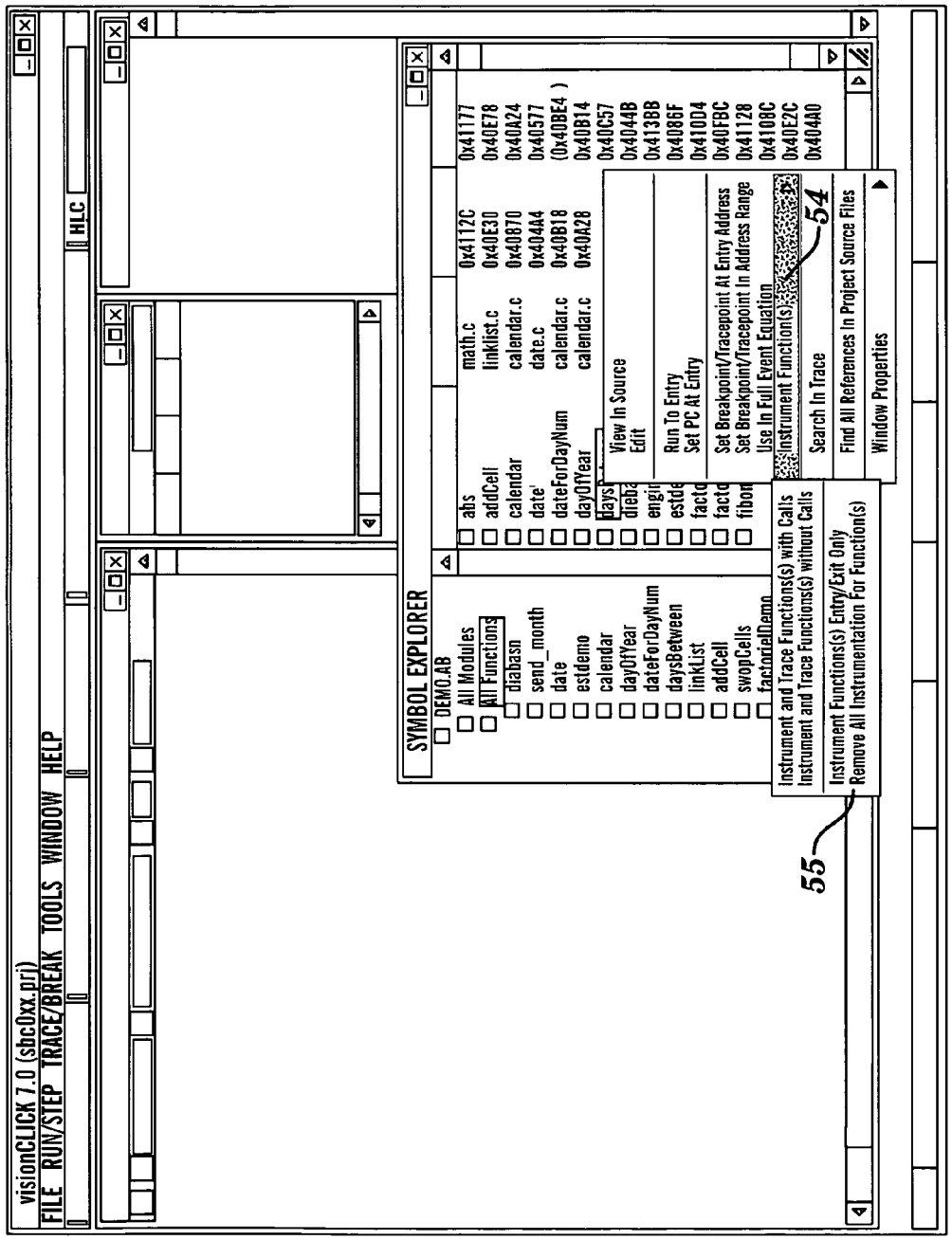
FIG. 6 is a screen display of an additional step in the operation of an embodiment of the present invention.
Figure 7:
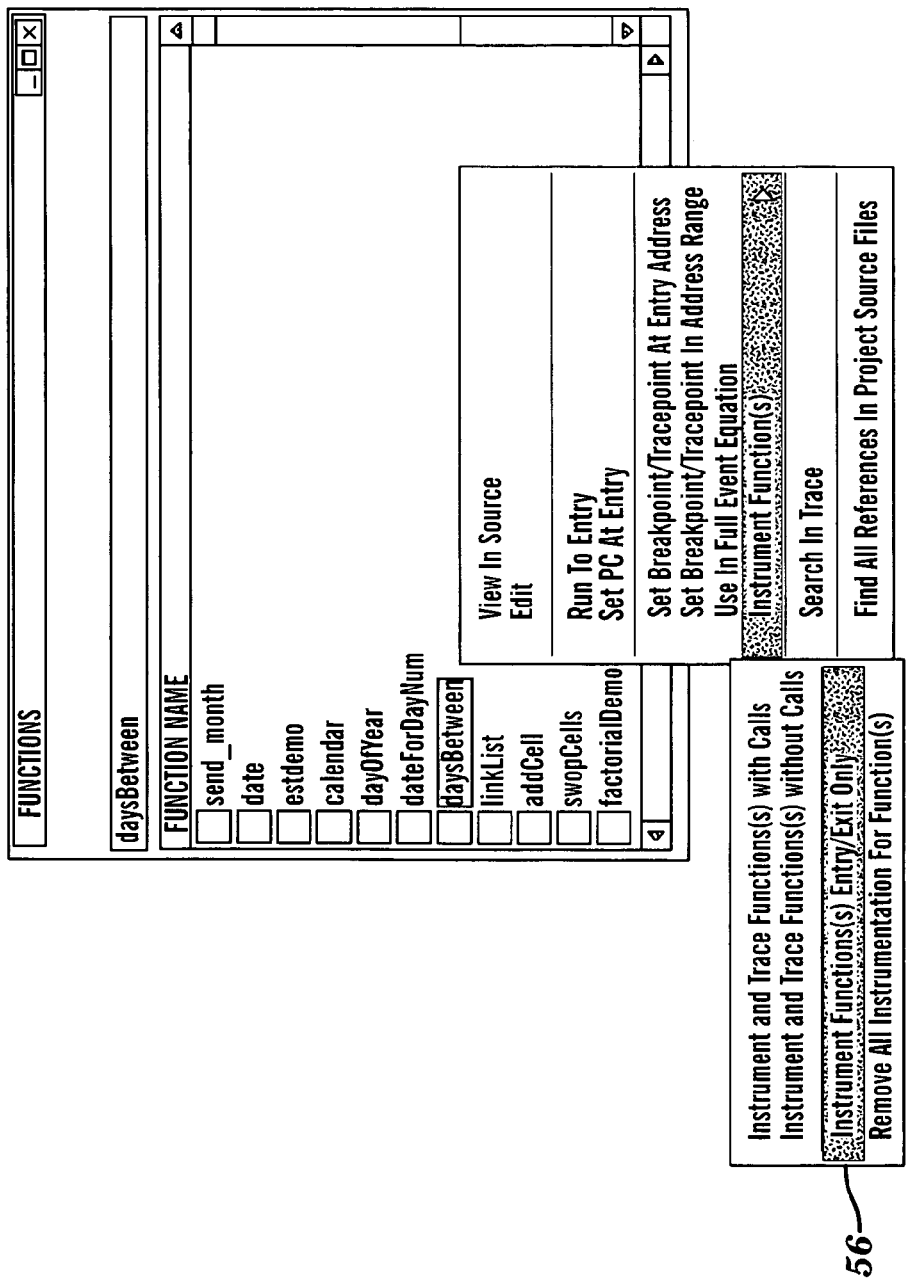
FIG. 7 is a screen display of a further step in the operation of an embodiment of the present invention.
Figure 8:
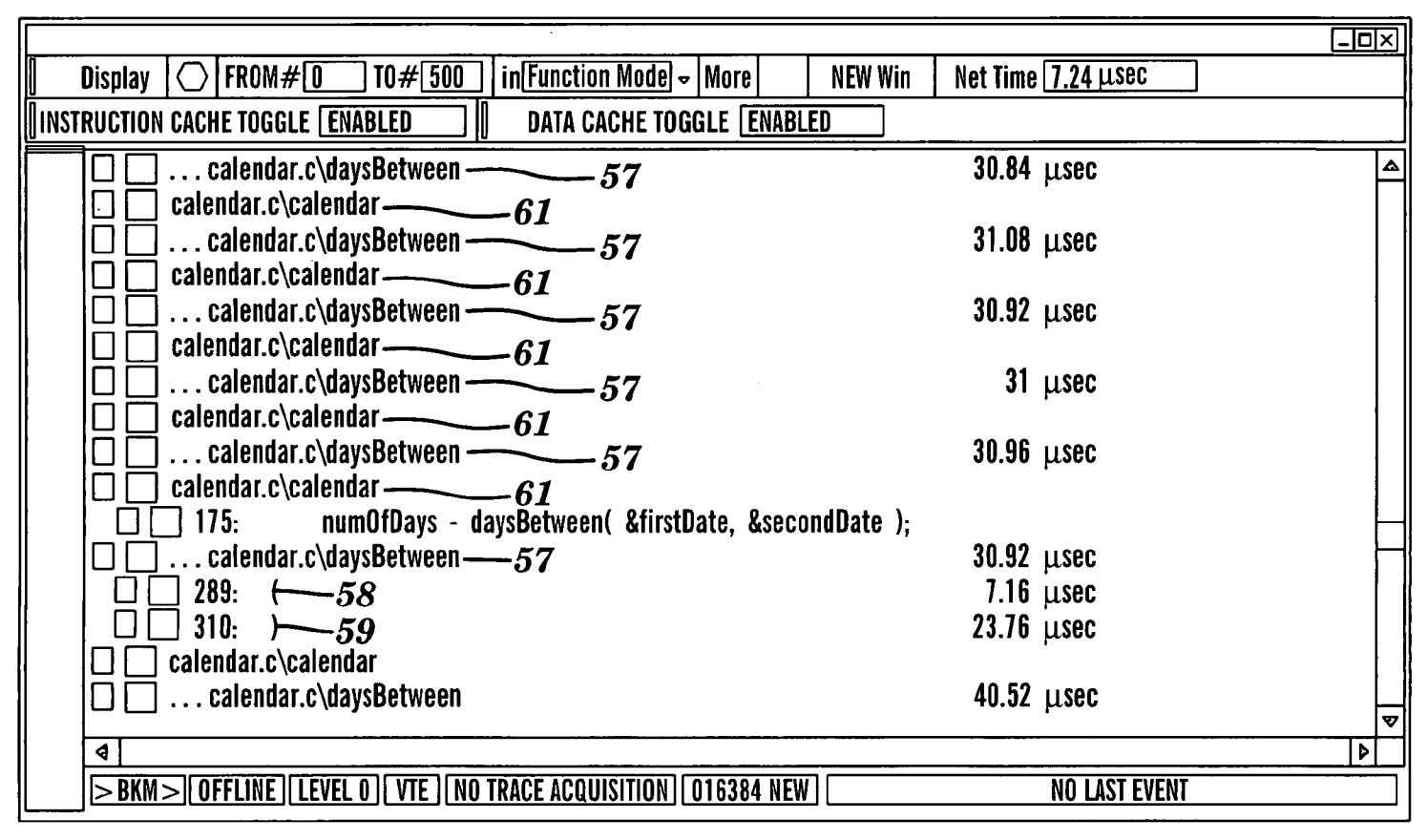
Figure 9:
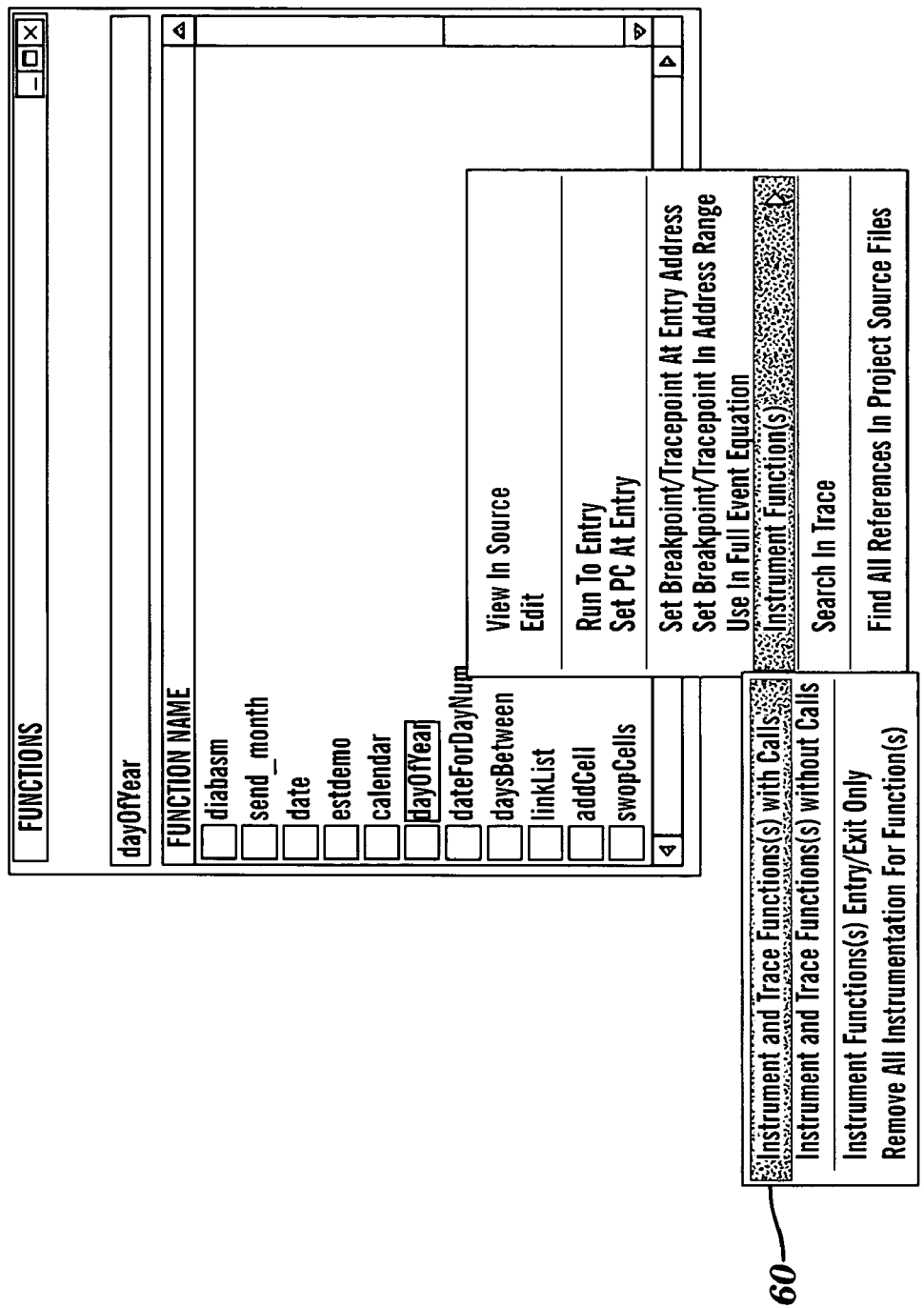
FIG. 9 is a screen display of a further step in the operation of an embodiment of the present invention.

Turning to FIG. 6, in a preferred embodiment, specific functions to instrument and trace may be selected as at 54 which in turn activates an Instrument Functions menu 55 generated by instrumentation module 12 (FIG. 3). Turning to FIG. 7, selecting the Entry/Exit Only command 56 invokes Entry/Exit module 16 (FIG. 3) to capture every instance within a desired address range in which a selected function is called. In a preferred embodiment, any function that called the selected function also may be indicated. This command 56 is useful for tracing function/performance information, such as time stamp and sequence information. FIG. 8 is an example of an output generated by use of the Entry/Exit Only function 56. In this example, the function "daysBetween" has been instrumented for only Entry/Exit. Each Entry/Exit is indicated by the display of "c\daysBetween" as at 57 (which indicates that the function has been called). Also visible is the function "calender" (as at 61) because it called the function "daysBetween". A user may "drill down" by actuating (i.e., clicking) on the '+' icon in a manner known to those familiar with Microsoft® software, such as "Microsoft® Explorer™", to show expanded detail such as the opened and closed brackets 58 and 59 which correspond to Entry and Exit of a function, respectively. In the example shown, only one instance of Entry/Exit has been shown in expanded detail. Turning to FIG. 9, the instruction Instrument and Trace Functions with Calls 60 may be selected by the user to invoke module 18 (FIG. 3) to provide more detailed visibility into the executing code. This provides entire program flow for instrumented functions and also for nested functions (i.e., calls or children) of the instrumented function(s), as shown in FIG. 10. Turning to FIG. 10, the function "dayOfYear" 62 is instrumented and trace is also displayed for all other nested functions as shown at 64. The Instruction Cache toolbar 44 is displayed as "disabled" because cache is disabled for this particular routine thus permitting instruction fetches occurring on the bus to be captured.

Figure 11:
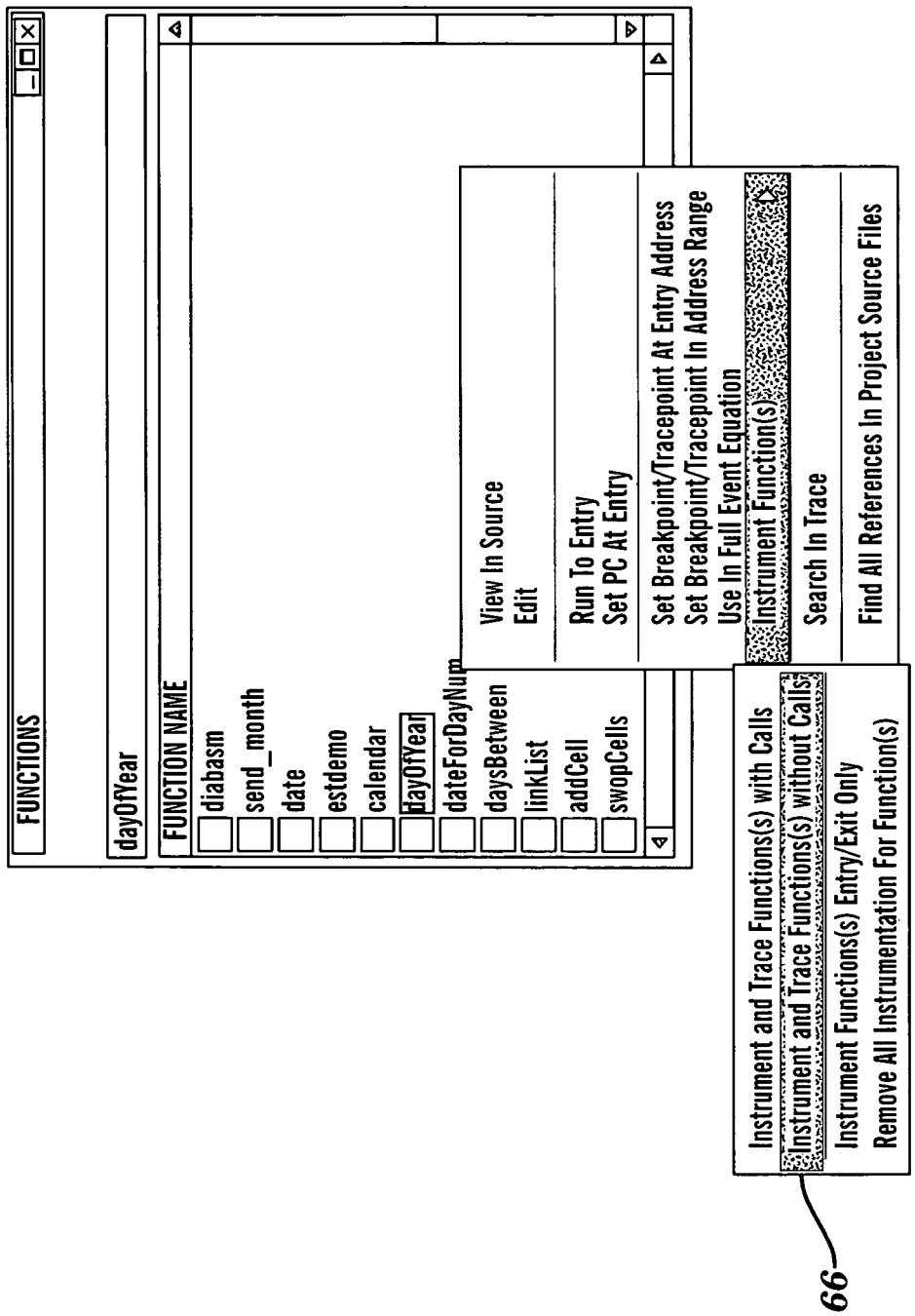
FIG. 11 is a screen display of a further command step in the operation of an embodiment of the present invention.
Figure 12:
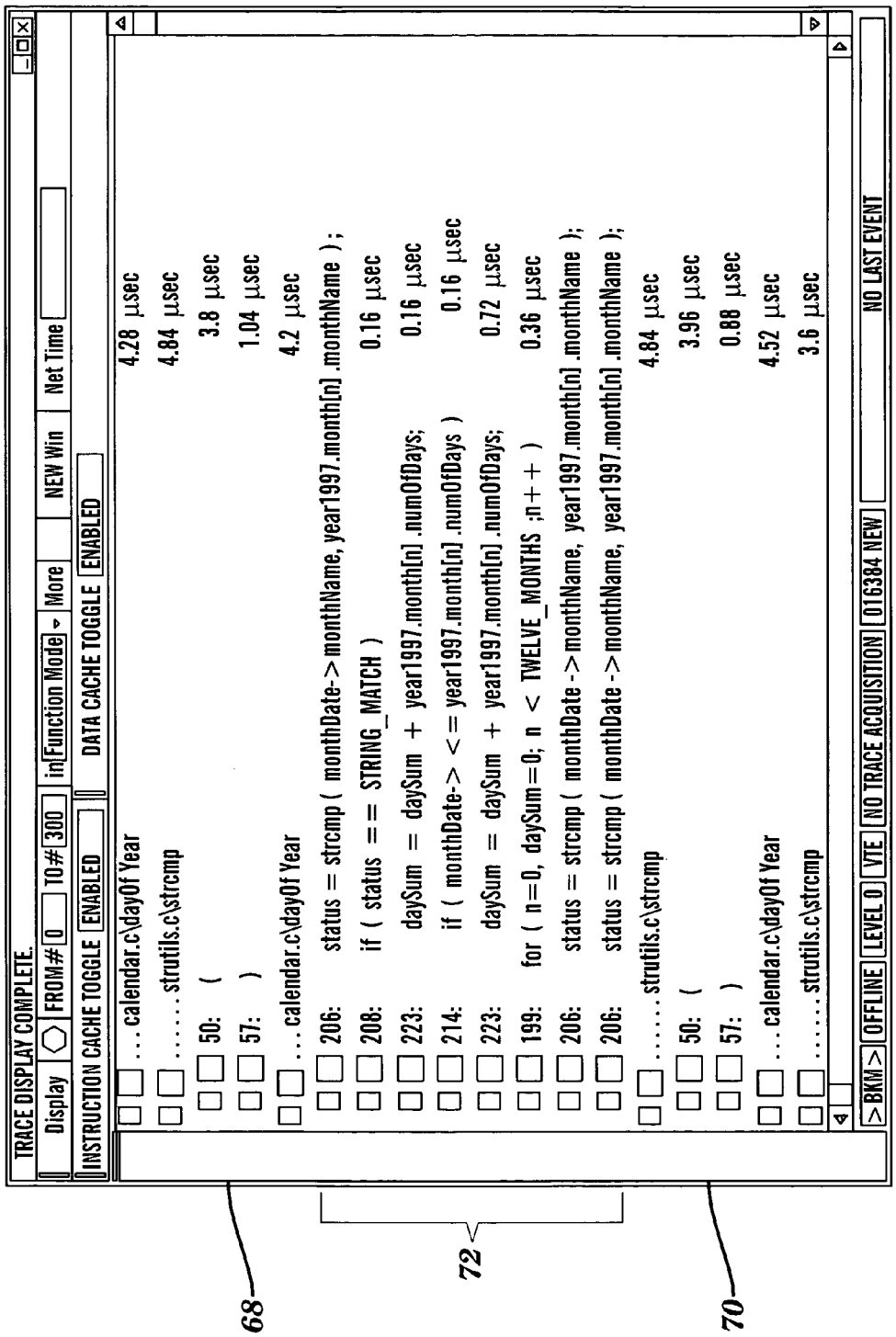
FIG. 12 is a screen display of the results of the operation of an embodiment of the present invention shown in FIG. 11.

Turning now to FIG. 11, the instruction Instrument and Trace Function(s) Without Calls 66 may be selected to invoke module 20 (FIG. 3) to view program flow of a function (e.g., dayOfyear) without full trace for associated calls. When selected, Entry/Exit visibility for calls associated with the selected function is provided as at 68 and 70 of FIG. 12, with the trace of the function shown in expanded form at 72.

An embodiment of the present invention is advantageously capable of being utilized with various target processors regardless of whether or not they include specific debugging/emulation tools or systems integrated therein. Moreover, the invention does not necessitate increasing the size (lines) of executable code being debugged, and is capable of monitoring the execution of individual code instructions by selectively disabling and enabling portions of the code, while permitting remaining portions of the code to run at full (cache enabled) speed.

Moreover, although an embodiment of the present invention has been described hereinabove as utilized with an external bus/state analyzer to capture information on the bus, it should be recognized by those skilled in the art that the present invention may be utilized in combination with a software system which may store the desired information (i.e., entry/exit markers and/or traces, etc.) within a circular buffer which would automatically cycle to keep the latest executed instructions therein. In this manner, an embodiment of the present invention may be implemented in combination with a bus/state analyzer implemented in hardware, software, or a combination thereof.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Figure 13:
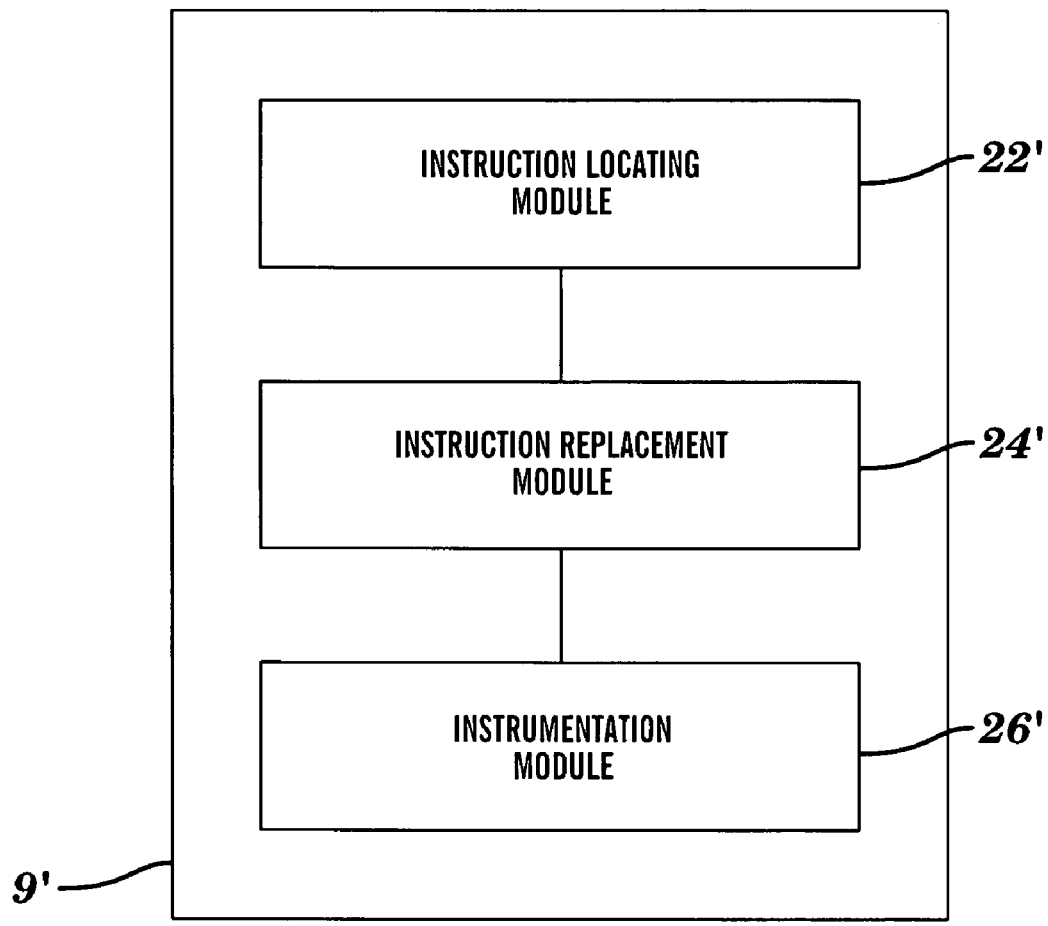
FIG. 13 is a block diagram/flow chart of an alternate embodiment of a code monitoring system of an embodiment of the present invention.
Figure 14:
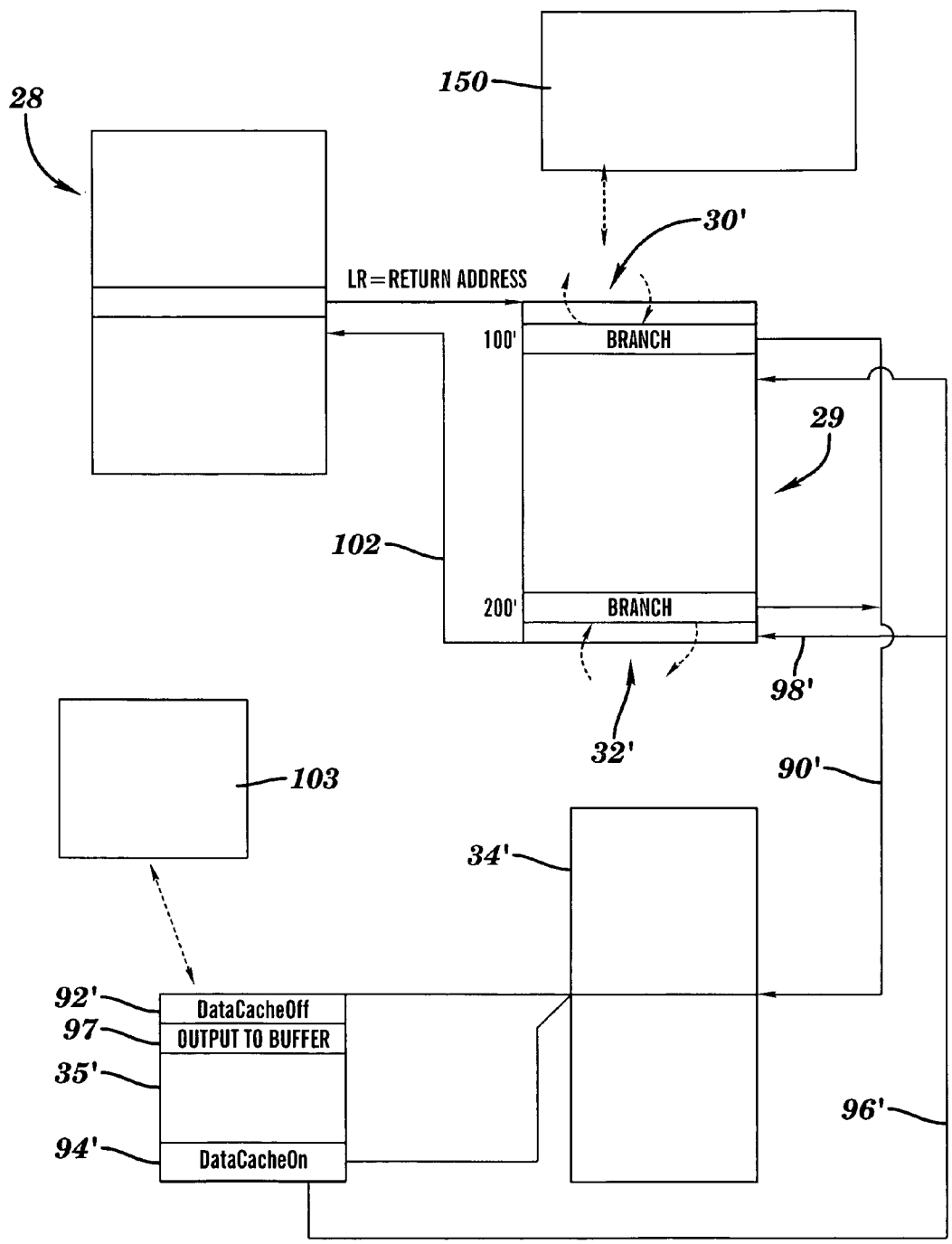
FIG. 14 is a block diagram/flow chart of an example of operations performed by the code monitoring system of FIG. 13.
Figure 15:
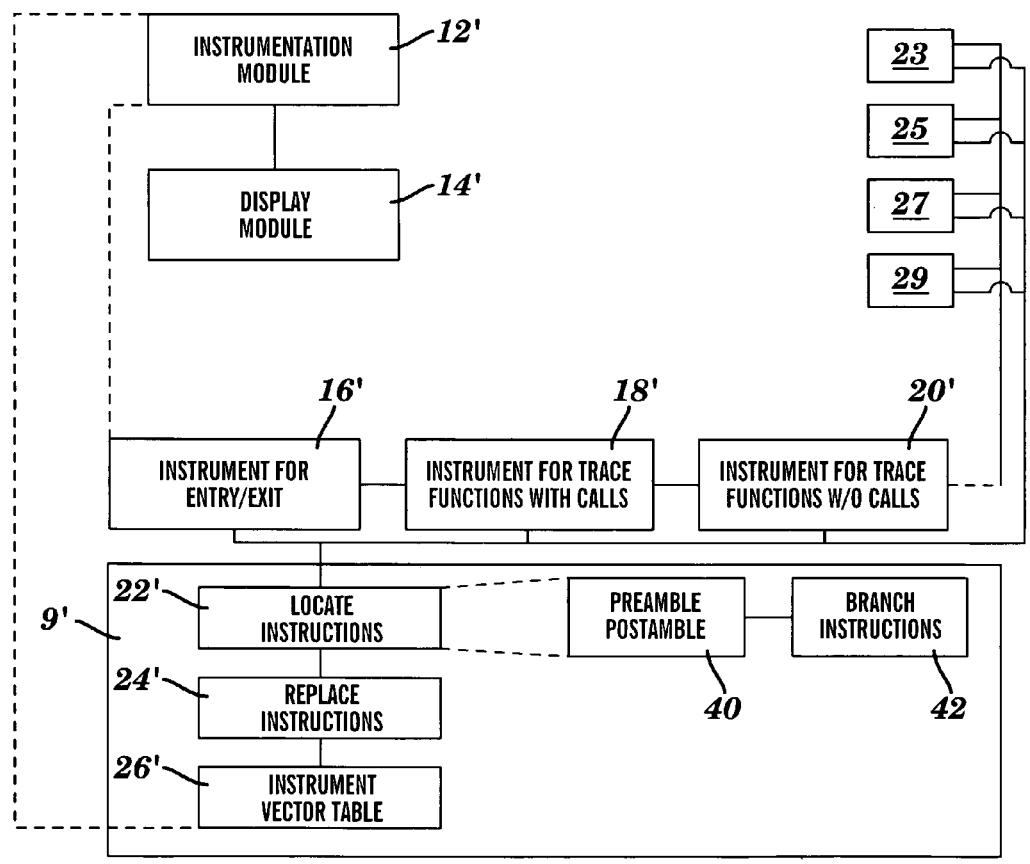
FIG. 15 is an expanded block diagram/flowchart of an embodiment of the present invention including the code monitoring system of FIG. 13.

Referring now to FIGS. 13–15, aspects of an alternate embodiment of the present invention are shown. This embodiment includes an instrumentation block 9' shown schematically in FIG. 13. Instrumentation block 9' includes an instruction locating module 22' coupled to an instruction replacement module 24' which is in turn coupled to an instrumentation module 26'. This embodiment operates substantially as described hereinabove with respect to instrumentation block 9, while using instruction locating module 22' to identify functions and other program code locations other than by locating the aforementioned "special instructions" (i.e., EABI preamble and postamble instructions). Rather, this embodiment (block 9') may locate functions to be instrumented by using locating module 22' to identify preamble/postamble, local/global data, and other desired instructions by analyzing conventional debug information supplied by the compiler during compilation of the program code 28 (FIG. 14). This compiler-derived information may be conveniently used to delineate the beginning/end of the function, a particular source code line, and/or to track nominally any manipulation of data, such as described in greater detail hereinbelow in Table 4. Examples of such compiler-derived conventional debug information include that provided in the well-known 'stabs' debug format, which generates debug code having '.stab' extensions to identify various predetermined points of the program code during program compilation. Additional conventional debug formats and/or programs that may be used include 'elf' (using '.elf' extensions) and 'dwarf' (using '.dwarf' extensions). The skilled artisan will recognize that these debug entries may be commonly used to identify numerous program locations/actions, including beginning/end of functions, manipulation of data (i.e., reads/writes), etc. Instrumentation block 9' uses this debug information in lieu of, or in addition to, the EABI preamble/postamble information discussed hereinabove with respect to block 9, to identify information such as functions, data manipulation, and/or additional program information. Once identified, this embodiment may operate substantially as described hereinabove with respect to block 9, e.g., by using replacement module 24' to substitute misalignment instructions (such as instruction 30 of FIG. 2) to enable code execution to occur on a bus. Alternatively, operation of this embodiment may occur as shown in FIG. 14.

Advantageously, embodiments of the present invention may perform these functions during run time of the software code, i.e., during the time in which the executable (i.e., compiled) version of code is running on a target system. In other words, one or more of these functions performed by the present invention, (e.g., searching, replacing, and/or inserting instructions) are effected at some time after the code is compiled. In one embodiment in particular, execution of the software code in the target is momentarily halted in order to perform functions such as substituting program flow change instructions into the code. A reason for this is that some conventional processors, such as those with JTAG/BDM interfaces, require use of the processor to access memory. Once these operations are completed, this embodiment automatically releases control of the target CPU and execution of the software code automatically continues.

Although this momentary cessation of code execution may be used in some embodiments, the skilled artisan will recognize that the operations effected by these embodiments may be effected without halting (e.g., may be performed in parallel with) the code execution without departing from the spirit and scope of the present invention.

As used herein, the term 'run time' excludes the term 'compile time' (the time during which a program is compiled), so that 'run time' includes any time after the program is compiled or assembled. As used herein, the term 'substitute' or 'substituting' includes replacing, attaching, and/or otherwise modifying an original instruction with another (e.g., program flow change) instruction. The term 'original instruction' refers to either one or more source code instructions (e.g., opcodes) or one or more object (e.g., machine) code instructions.

Turning now to FIG. 14, instrumentation block 9' may operate by using replacement module 24' to replace the first instruction (e.g., an instruction at address 100') of program code 28 with other types of instructions that cause a change in program flow (such as a "branch" or "jump to subroutine" instruction 30'). Replacement module 24' may then insert the original (e.g., first) instruction into a translation table (also referred to as an instrumentation table) 150. As shown below, translation table 150 includes the original instruction along with additional information intended to facilitate restoring the program code 28 to its original state once the instrumentation is removed (e.g., after monitoring has been completed). For example, Table 150 may include information conveying the operation to be performed by the instrumentation instruction (i.e. branch, jump, or exception). Translation table 150 may be located within the memory of the host processor.

Translation Table 150

| Address of the original opcode) | Original Opcode | Action to be performed (by program flow change instruction) | Address of scratchpad buffer 34' | Size of the code (of the routine 35' in the buffer 34') | Unique ID for the action to be performed |
|---|---|---|---|---|---|
| 0x100100 | 0x914b004 | Jump to Subroutine | 0x400000 | 0xf0 | 0x1 |

The change in program flow (e.g., "branch") instruction 30' branches 90' the program 28 to a scratch pad 34'. (Scratchpad 34' is analogous to exception table 34 discussed hereinabove.) Scratchpad 34', which may be located in the memory of the target processor, is provided with additional instructions (e.g., a routine) 35' by scratchpad instrumentation module 26' (FIG. 13). This routine 35' may include turning cache off and on as shown at 92' and 94', so that instructions execute on the bus. Moreover, in lieu of, or in addition to providing visibility by bus execution, routine 35' may include one or more output instructions 97, such as a "printf" statement, that generate output to a trace buffer 103. Trace buffer 103 may be located in the memory of the target device running the code 28. This buffer 103 is viewable by a conventional debugger to effectively enable instructions and/or data manipulation effected by routine 35' to be traced. Examples of some specific operations that this embodiment may perform include those set forth in the following Table 4:

TABLE 4

1. Capturing entry/exit of a function 16';
2. Tracing code execution with or without calls, 18', 20', respectively (FIG. 15);
3. Capturing data manipulation 23 (Capturing the data passed between a calling function and the callee);
4. Inserting arbitrary code statements 25 (patch code, i.e., to alter behavior of a code portion);
5. Capturing the sequence of program
6. execution 27; and
7. Capturing changes to local or global variables 29, In a manner that is substantially similar to that described hereinabove for block module 12, a user may actuate instrumentation module 12' (FIG. 15) to designate a particular desired operation (such as indicated in Table 4). Once so designated, block 9' may implement the operation, such as included in the following Table 5:

TABLE 5

1) Identify the address (e.g., address 100') in the main code segment 28 where the first instruction of interest (e.g., the preamble of a function) is located.
2) Select the particular trace acquisition code statement(s) (including program flow change instructions 30' that will produce a sequence of machine (object code) instructions necessary to perform the designated action (e.g., one of the actions listed in Table 4), including outputting the result to buffer 103. This may typically require analyzing the symbol table generated during compilation or assembly of the code 28 in the target processor to know how to access data structure thereof. (This step may be accomplished by calls to other "canned" routines such as a special "printf" or "scanf" function to monitor values or to allow dynamic modification of existing values. (For example, the special 'printf' function may be a conventional C 'printf' modified to direct output to the buffer 103.) Similarly, a value may be patched (inserted) after an assignment to watch the behavior of the change, as discussed below.)
3) Copy/Paste the code statement(s) 30' (FIG. 14), as well as the original (e.g., substituted) instructions of the code 28, into translation (instrumentation) table 150.
4) Determine the size of the machine code statements generated in step (2), the code to save/restore the original register context (e.g., using the information stored in Instrumentation Table 150), the original instruction, and code 32' to redirect 96', 98' (FIG. 14) execution to the address following the original instruction(s).
5) Allocate memory in the scratchpad 34' of the size determined in step (4).
6) Insert the new machine code described in step (4) into the memory allocated in the scratchpad 34'.
7) Substitute (e.g., attach and/or modify) the memory location (e.g., 100', 200', in FIG. 14) of the desired original instruction to contain the program flow change TABLE 5-continued instruction 30', 32', etc., that vectors 90' program execution to the start address of the newly allocated code space within the scratchpad 34'. This step (7) may be performed after completion of steps (1–6) to help prevent the premature vectoring.

As mentioned hereinabove, substituting (as in Step 7 of Table 5) may include attaching a code statement(s), for example, at a source line, which then enables block 9' to derive the assembly address (e.g., 100', 200') of a machine code statement associated with the original source line and substitute this (original) machine code statement with the change in program flow instruction 30', 32' that would cause the change in program flow instruction to be executed along with the original source code instruction associated with that address. The address of the instruction 30', 32', the original instruction, and knowledge of the memory block that has been allocated within scratch pad 34' for the inserted code statement(s), is maintained within translation table 150 in order to reverse the action, as discussed hereinabove. Table 150 may also retain the inserted code statement 30', 32' to permit a "change" report to be generated upon demand.

Although the program flow changes instructions 30' and 32' are described as being inserted at the beginning and ending of a program code segment, the skilled artisan will recognize that they may be substituted at any desired location within the code segment, such as described in the additional examples hereinbelow, without departing from the spirit and scope of the present invention.

Additional examples of various embodiments of the present invention are now discussed. These examples are not to be construed as limiting.

ADDITIONAL EXAMPLES

Example 1

This example describes the "code insertion" instrumentation behavior of step 3 of Table 4 above. This example examined a function such as "add_values_reference" that receives pointers to structures and adds their values together returning them in a global structure. In the event this function appears to be operating incorrectly, the "patch" or "code insertion" feature (step 3) of Table 4 may be used to dynamically insert code to monitor (e.g., by a "printf" statement 97 that outputs the values to buffer 103), or code to alter behavior (such as forcing a known value into a variable). For simplicity, in this example, "add_values_reference" performs only an assignment. Sample code used in this Example 1 is shown as "Sample Code Listing 1" hereinbelow.

```
Sample Code Listing 1:
int add_values_reference(MY_STRUCT *structure1, MY_STRUCT *structure2)
{
        global_struct_2.integer_value = structure1->integer_value +
structure2->integer_value;
        global_struct_2.char_value = structure1->char_value +
structure2->char_value − '0';
        return(global_struct_2.integer_value);
}
Resulting Machine (Object) Code listing:
        00000166  03  0000  005a  ffff   877          .d1line        90
        0000016c  03  0000  0208
        00000208  00  9421  fff0          878          stwu           r1,−16(r1)
        0000020c  00  7c08  02a6          879          mfspr          r0,lr
                                          880  #$$br
        00000210  00  93c1  0008          881          stw            r30,8(r1)
        00000214  00  93e1  000c          882          stw            r31,12(r1)
                                          883  #$$er
        00000218  00  9001  0014          884          stw            r0,20(r1)
                                          885  #$$ee
        0000021c  00  7c7f  1b78          886          mr             r31,r3
        00000220  00  7c9e  2378          887          mr             r30,r4
                                          888  #     global_struct_2.integer_value =
structure1->integer_value + structure2->integer_value;
                                          889  .L77:
        00000170  03  0000  005b  ffff   890          .d1line        91
        00000176  03  0000  0224
        00000224  00  819f  0000          891          lwz            r12,0(r31)
        00000228  00  817e  0000          892          lwz            r11,0(r30)
        0000022c  00  7d8c  5a14          893          add            r12,r12,r11
        00000230  00  9180  0000          894          stw
        r12,global_struct_2@sdarx(r0)
                                          895  #     global_struct_2.char_value = structure1-
>char_value + structure2->char_value − '0'
                                          ;
        0000017a  03  0000  005c  ffff   896          .d1line        92
        00000180  03  0000  0234
        00000234  00  895f  0004          897          lbz            r10,4(r31)
        00000238  00  893e  0004          898          lbz            r9,4(r30)
        0000023c  00  7d4a  4a14          899          add            r10,r10,r9
        00000240  00  394a  00d0          900          addi           r10,r10,208
        00000244  00  9940  0000          901          stb
        r10,(global_struct_2+4)@sdarx(r0)
                                          902  #     return(global_struct_2.integer_value);
        00000184  03  0000  005d  ffff   903          .d1line        93
```

-continued

| | | | | | | | |
|---|---|---|---|---|---|---|---|
| 0000018a | 03 | 0000 | 0248 | | | | |
| 00000248 | 00 | 8060 | 0000 | 904 | | lwz | r3,global_struct_2@sdarx(r0) |
| | | | | 905 | # } | | |
| 0000018e | 03 | 0000 | 005e ffff | 906 | | .d1line | 94 |
| 00000194 | 03 | 0000 | 024c | | | | |
| | | | | 907 | #$$be | | |
| | | | | 908 | #$$br | | |
| 0000024c | 00 | 83c1 | 0008 | 909 | | lwz | r30,8(r1) |
| 00000250 | 00 | 83e1 | 000c | 910 | | lwz | r31,12(r1) |
| | | | | 911 | #$$er | | |
| 00000254 | 00 | 8001 | 0014 | 912 | | lwz | r0,20(r1) |
| 00000258 | 00 | 7c08 | 03a6 | 913 | | mtspr | lr,r0 |
| 0000025c | 00 | 3821 | 0010 | 914 | | addi | r1,r1,16 |
| | | | | 915 | #$$tl 0x8 0x0 | | |
| 00000260 | 00 | 4e80 | 0020 | 916 | | blr | |
| | | | | 917 | #$$ef | | |

As an example of displaying a variable, to print variable "global_struct_2.integer_value" before the assignment was made, the system may attach a code statement to a desired source line 100" (shown in Sample Code Listing 2 below), substituting the first machine code instruction 224 associated with this high level line of source with a change in program flow instruction 30". This embodiment is able to determine the address range of assembly instructions associated with this single line of source 100" by monitoring the debug (e.g., ".stabs") "line" information that associates a high level line of source (e.g., 100") to one or more machine instructions.

Sample Code Listing 2

```
int add_values_references(MY_STRUCT *structure1, MY_STRUCT *structure2)
{
------> 100"  global_struct_2.integer_value = structure1—>integer_value
        + structure2—>integer_value;
-> 30"  00000224  00  819f  0000    891    lwz    r12, 0 (r31)
        00000228  00  817e  0000    892    lwz    r11, 0 (r30)
        0000022c  00  7d8c  5a14    893    add    r12, r12, r11
        00000230  00  9180  0000    894    stw
        r12,global_struct_2@sdarx (r0)
        global_struct_2.char_value = structure1->char_value + structure2->char_value – '0';
        return (global_struct_2.integer_value);
}
```

As shown in Sample Code Listing 3 below, to monitor the variable "global_struct_2.integer_value" after the assignment, another code statement 30" may be attached to the same source line 100". But instead of substituting for the first machine code instruction 224 associated with the source line 100", instruction 30" is substituted for the last machine instruction 230 associated with the line of source 100". A similar approach may also be taken for modifying a variable after the assignment.

Sample Code Listing 3

```
int add_values_references(MY_STRUCT *structure1, MY_STRUCT *structure2)
{
------> 100"  global_struct_2.integer_value = structure1—
        >integer_value + structure2—>integer_value;
        00000224  00  819f  0000    891    lwz    r12, 0 (r31)
        00000228  00  817e  0000    892    lwz    r11, 0 (r30)
        0000022c  00  7d8c  5a14    893    add    r12, r12, r11
-> 30"  00000230  00  9180  0000    894    stw
        r12,global_struct_2@sdarx (r0)
        global_struct_2.char_value = structure1->char_value +
```

-continued

Sample Code Listing 3

```
structure2->char_value = 'C';
    return(global_struct_2.integer_value);
}
```

Additional steps may then be implemented as included in Table 5 above.

Example 2

The sample code of Example 1 may be instrumented to force a value (Step 5 of Table 4 and the steps of Table 5 hereinabove) to a variable after it was modified by normal program flow. In this example, step 2 of Table 5 adds a "global_struct_2.integer_value=10" to force "global_struct_2.integer_" to a value of 10 after it was modified by normal program flow. This generates a change (relative to the Sample Code Listing 1) in the machine code in memory at line 244, as shown in Sample Code Listing 4A below. As shown, the original instruction at line 244 has been replaced with a program flow change instruction 30''' branching 90' (FIG. 14) execution to the scratchpad buffer 34'' shown in Sample Code Listing 4B. The code in the buffer 34'' effects the desired data manipulation (i.e., forcing the value to 10), and branches execution back to line 248. Line 248 line is thus effectively changed since this instruction places the forced value into register r3 as shown.

Sample Code Listing 4A

```
                                           895  #      global_struct_2.char_value = structure1—
    >char_value + structure2—>char_value - '0';
          0000017a 03 0000 005c ffff  896       .dline    92
          00000180 03 0000 0234
          00000234 00 895f 0004       897       lbz       r10,4 (r31)
          00000238 00 893e 0004       898       lbz       r9,4 (r30)
          0000023c 00 7d4a 4a14       899       add       r10,r10,r9
          00000240 00 394a 00d0       900       addi      r10,r10,208
          00000244 00 4820 0000       901       bl        0x200000
                                      902
                                      903  #      return(global_struct_2.integer_value);
          00000184 03 0000 005d ffff            .dline    93

0000018a 03 0000 0248
          00000248 00 8060 0000       904       lwz       r3,global_struct_2@sdarx(r0)
                                      905  # )
          0000018e 03 0000 005e ffff  906       .dline    94
          00000194 03 0000 024c
                                      907
                                      908  #$$be
                                      909  #$$br
          0000024c 00 83c1 0008       910       lwz       r30,8(r1)
          00000250 00 83e1 000c       911       lwz       r31,12(r1)
                                      912  #$$er
          00000254 00 8001 0014       913       lwz       r0,20(r1)
          00000258 00 7c08 03a6       914       mtspr     1r,r0
          0000025c 00 3821 0010       915       addi      r1,r1,16
                                      916  #$$tl 0x8 0x0
          00000260 00 4e80 0020                 blr
                                      918  #$$ef
```

Sample Code Listing 4B (Buffer 34'')

```
0x00200000        9940 0000    stb    r10,(global_struct_2+4)@sdarx(r0)
0x00200004        ; our code to save registers used by additional
0x20000008        ; code statements
                  ; Machine code to execute code statement(s)
                  ; to modify global_struct_2.integer_value
                  ; machine code to restore registers saved above
0x20010000        4e80 0020
                  blr
```

For purposes of this Example 2, the scratchpad buffer 34" begins in memory location 0x00200000, and the routine 35' (FIG. 14) for the desired operation is the first memory allocation within scratchpad 34'. Given these parameters, the routine 35' to effect the desired instrumentation starts at address 0x 00200000 as shown.

To "undo" this instrumentation, instrumentation module 12' (FIG. 15) changes the instruction at the original location (in this example, at line 244) back to its original value (e.g., shown in Sample Code Listing 1) and frees the allocated memory in the scratchpad 34' for future use. In the event complex variables are used, i.e., in which multiple machine instructions are required for the assignment to take place, the high level source line debug information (e.g., '.stabs' information) enables this embodiment of the present invention to properly locate the desired statement following the assignment.

Example 3

In this example, the "data capture" instrumentation behavior (e.g., function 3 of Table 4) is described with reference to the functions "reference_function" and "value_function". These functions both use the global parameter 'global_struct_1', shown with arrows "→" in Sample Code Listing 5A below.

Sample Code Listing 5A

Original source code:
MY_STRUCT reference_function(int *parameter1, char *parameter2)
{
    MY_STRUCT local_struct;
    local_struct.integer_value = *parameter1;
    local_struct.char_value = *parameter2;

-continued

Sample Code Listing 5A

→    global_struct_1.integer_value = *parameter1;

return(local_struct);
}
MY_STRUCT value_function(int parameter1, char parameter2)
{
    MY_STRUCT local_struct;
    local_struct.integer_value = parameter1;
    local_struct.char_value = parameter2;

→    global_struct_1 = local_struct;

return (local_struct);
}

In order to capture all modifications to "global_struct_1", instrumentation module 12' analyzes the symbol table (e.g., generated during compiling the original source code) to find every location where the symbol is referenced. Module 12' then looks within the compiled source code for machine instructions that perform "write" operations to known data structure locations. The debug (e.g., ".stabs") information provided by the compiler allows the location of the data to be determined, even in the event the data exists only within registers of the CPU. All that is then required to determine the modification of a data value is the instruction (e.g., opcode) format that generates memory and register writes and the scope of existence for the data. Once this information is obtained, instrumentation module 12' may capture the Values in the trace buffer 103 (FIG. 14) for each instance in which the variable/data structure has been deliberately modified.

The resulting machine code listing generated by the above source code (in Sample Code Listing 5A) is shown below in Sample Code Listing 5B. Arrows ("→") indicate the references (at lines 627 and 768) to 'global_struct_1':

| | | Sample Code Listing 5B | | |
|---|---|---|---|---|
| char *paraneter2) | | 515 | # MY_STRUCT reference_function(int *parameter1, | |
| | | 516 | # } | |
| | | 517 | | |
| | | 518 | #$$bff | |
| | | 510 | .align | 2 |
| | | 520 | .globl | reference_function |
| | | 521 | reference_function: | |
| 000000ee 03 | 0000 0044 ffff | 605 | .dlline | 68 |
| 000000f4 03 | 0000 0150 | | | |
| 00000150 00 | 9421 ffe8 | 606 | stwu | r1,-24(r1) |
| 00000154 00 | 7c08 02a6 | 607 | mfspr | r0.1r |
| | | 608 | #$$br | |
| 00000158 00 | 93c1 0010 | 609 | stw | r30,16(r1) |
| 0000015c 00 | 93e1 0014 | 610 | stw | r31,20(r1) |
| | | 611 | #$$er | |
| 00000160 00 | 9001 001c | 612 | stw | r0,28(r1) |
| | | 613 | #$$ee | |
| 00000164 00 | 7c7f 1b78 | 614 | mr | r31,r3 |
| 00000168 00 | 7c9e 2378 | 615 | mr | r30,r4 |
| | | 616 | # | MY_STRUCT local_struct; |
| | | 617 | # | |
| | | 818 | # | local_struct.integer_value = |
| *parameter1; | | | | |
| | | 619 | .L51: | |
| 000000f8 03 | 0000 0047 ffff | 620 | .dlline | 71 |

-continued

Sample Code Listing 5B

| | | | | | |
|---|---|---|---|---|---|
| 000000fe 03 | 0000 016c | | | | |
| 0000016c 00 | 819f 0000 | 621 | | lwz | r12,0(r31) |
| 00000170 00 | 9181 0008 | 622 | | stw | r12,8(r1) |
| | | 623 | # | local_struct.char_value = *parameter2; | |
| 00000102 03 | 0000 0048 ffff | 624 | | .dlline | 72 |
| 00000108 03 | 0000 0174 | | | | |
| 00000174 00 | 897e 0000 | 625 | | lbz | r11,0(r30) |
| 00000178 00 | 9961 000c | 626 | | stb | r11,12(r1) |
| | | 627 | # | global_struct_1.integer_value = parameter1; | |
| 0000010c 03 | 0000 0049 ffff | 626 | | .dlline | 73 |
| 00000112 03 | 0000 017c | | | | |
| 0000017c 00 | 815f 0000 | 829 | | lwz | r10,0(r31) |
| 00000180 00 | 9140 0000 | 830 | | stw | r10,global_struco_1@sdarx(r0) |
| | | 631 | # | | |
| | | 632 | # | return(local_struct); | |
| 00000116 03 | 0000 004b ffff | 633 | | .dlline | 75 |
| 0000011c 03 | 0000 0184 | | | | |
| 00000184 00 | 3961 0008 | 634 | | addi | r11,r1,8 |
| 00000188 00 | 806b 0000 | 635 | | lwz | r3,0(r11) |
| 0000018c 00 | 808b 0004 | 636 | | lwz | r4,4(r11) |
| | | 637 | # } | | |
| 00000120 03 | 0000 004c ffff | 638 | | .dlline | 76 |
| 00000126 03 | 0000 0190 | | | | |
| | | 639 | #$$be | | |
| | | 640 | #$$br | | |
| 00000190 00 | 83c1 0010 | 641 | | lwz | r30,16(r1) |
| 00000194 00 | 83e1 0014 | 642 | | lwz | r31,20(r1) |
| | | 643 | #$$er | | |
| 00000198 00 | 8001 001c | 644 | | lwz | r0,28(r1) |
| 0000019c 00 | 7c08 03a8 | 646 | | mtspr | 1r,r0 |
| 000001a0 00 | 3821 0016 | 846 | | addi | r1,r1,24 |
| | | 647 | #$$t1 0x18 0x0 | | |
| 000001a4 00 | 4e80 0020 | 648 | | blr | |
| | | 649 | #$$ef | | |
| | | 650 | .L50: | | |
| | | 651 | | .section | .debug |
| | | 652 | .L58: | | |
| 0000035f 02 | 0000 0004 | 653 | | .4byte | 0x4 |
| | | 654 | | .previous | |
| | | 655 | | .type | reference_function,@function |
| | | 656 | | .size | reference_function,.-reference_function |
| | | 657 | | | |
| | | 658 | # Allocations for reference_function | | |
| | | 659 | # | r31 | parameter1 |
| | | 660 | # | r30 | parameter2 |
| | | 661 | # | SP,8 | local_struct |
| | | 662 | # MY_STRUCT value_function(int parameter1, char parameter2) | | |
| | | 663 | # { | | |
| | | 664 | | | |
| | | 665 | #$$bf | | |
| | | 666 | | .align | 2 |
| | | 667 | | .globl | value_function |
| | | 668 | value_function: | | |
| 0000012a 03 | 0000 004f ffff | 748 | | .dlline | 79 |
| 00000130 03 | 0000 01a8 | | | | |
| 000001a8 00 | 9421 ffe8 | 749 | | stwu | r1,-24(r1) |
| 000001ac 00 | 7c08 02a6 | 750 | | mfspr | r0,1r |
| | | 751 | #$$br | | |
| 000001b0 00 | 93c1 0010 | 752 | | stw | r30,16(r1) |
| 000001b4 00 | 93e1 0014 | 753 | | stw | r31,20(r1) |
| | | 764 | #$$er | | |
| 000001b8 00 | 9001 001c | 755 | | stw | r0,28(r1) |
| | | 756 | #$$ee | | |
| 000001bc 00 | 7c7f 1b78 | 757 | | mr | r31,r3 |
| 00000c0 00 | 7c9e 2378 | 758 | | mr | r30,r4 |
| | | 739 | # | MY_STRUCT local_struct; | |
| | | 760 | # | | |
| | | 761 | # | local_struct.integer_value = parameter1; | |
| | | 762 | .L64: | | |

Sample Code Listing 5B -continued

| | | | | | |
|---|---|---|---|---|---|
| 00000134 03 | 0000 0052 ffff | 763 | | .dlline | 82 |
| 0000013a 03 | 0000 01c4 | | | | |
| 000001c4 00 | 93e1 0008 | 764 | | stw | r31,8(c1) |
| | | 765 | # | local_struct.char_value = parameter2; | |
| 0000013a 03 | 0000 0053 ffff | 766 | | .dlline | 63 |
| 00000144 03 | 0000 01c8 | | | | |
| 000001c8 00 | 9bc1 000c | 767 | | stb | r30,12(r1) |
| | | 768 | # | global_struct_1 = local_struct; | |
| 00000148 03 | 0000 0054 ffff | 769 | | .dlline | 84 |
| 0000014e 03 | 0000 01cc | | | | |
| 000001cc 00 | 3960 0000 | 770 | | addi | r11,r0,global_struct_1@sdarx |
| 000001d0 00 | 3981 0008 | 771 | | addi | r12,r1,8 |
| 000001d4 00 | 812c 0000 | 772 | | lwz | r9,0(r12) |
| 000001d8 00 | 814c 0004 | 773 | | lwz | r10,4(r12) |
| 000001dc 00 | 912b 0000 | 774 | | stw | r9,0(r11) |
| 000001e0 00 | 914b 0004 | 775 | | stw | r10,4(r11) |
| | | 776 | # | | |
| | | 777 | # | return(local_struct); | |
| 00000152 03 | 0000 0056 ffff | 778 | | .dlline | 86 |
| 00000158 03 | 0000 01e4 | | | | |
| 000001e4 00 | 3961 0008 | 779 | | addi | r11,r1,8 |
| 000001e8 00 | 806b 0000 | 780 | | lwz | r3,0(r11) |
| 000001ec 00 | 808b 0004 | 781 | | lwz | r4,4(r11) |
| | | 782 | # } | | |
| 0000015c 03 | 0000 0057 ffff | 783 | | .dlline | 87 |
| 00000162 03 | 0000 01f0 | | | | |
| | | 784 | #$$be | | |
| | | 785 | #$$bc | | |
| 000001f0 00 | 83c1 0010 | 786 | | lwz | r30,16(r1) |
| 000001f4 00 | 83e1 0014 | 787 | | lwz | r31,20(r1) |
| | | 788 | #$$ec | | |
| 000001f8 00 | 8001 001c | 789 | | lwz | r0,28(r1) |
| 000001fc 00 | 7c08 03a6 | 790 | | mtspc | lr,r0 |
| 00000200 00 | 3821 0016 | 791 | | addi | r1,r1,24 |
| | | 792 | #$$t1 0x18 0x0 | | |
| 00000204 00 | 4e80 0020 | 793 | | dlr | |
| | | 794 | #$$ef | | |
| | | 795 | .L63: | | |
| | | 796 | | .section | .debug |
| | | 797 | .L71: | | |
| 0000041d 02 | 0000 0004 | 798 | | .4byte | 0x4 |
| | | 799 | | .previous | |
| | | 800 | | type | value_function,@function |
| | | 801 | | .size | value_function,.-value_function |
| | | 802 | | | |
| | | 803 | # Allocations for value_function | | |
| | | 804 | # | r31 | parameter1 |
| | | 805 | # | r30 | paramater2 |
| | | 806 | # | SP,8 | local_struct |
| | | 807 | # int add_values_reference(MY_STRUCT *structure1, MY_STRUCT *structure2) | | |

Each of the two assignments (at 627 and 768) is different. In the first instance (at 627) a single instruction stores the value, while in the second instance (at 768) multiple stores are required. To correctly handle this, instrumentation module 12' identifies the final assignment and replaces it with a program flow change instruction (30', 30", 30'", etc.,) to branch execution to scratchpad 34', 34", etc., to facilitate recording (e.g., outputting) the information. Steps implemented by this embodiment of the present invention are shown in the following Table 6:

TABLE 6

1) Identify the address blocks in the main code segment that are associated with the high level source line that modifies the identified variable/structure.

TABLE 6-continued

2) Locate the final machine instruction(s) for each modification of the variable/structure and retain the original instruction(s). These are the instruction(s) that will be replaced with the program flow change instruction(s) 30', 30", etc.

3) Select the particular trace acquisition code statement(s) (including program flow change instructions 30', 30", etc.) that will create the sequence of machine instructions necessary to output the data to the trace buffer 103. This may typically require analyzing the symbol table of the code 28 to know how to access the data structures thereof.

TABLE 6-continued

4) Copy/Paste the code statement(s) 30', 30", etc. (FIG. 14), as well as the original (e.g., substituted) instructions of the code 28, into translation (instrumentation) table 150.
5) Determine the size of: the machine code statements generated in step (3); the register context code to save/restore the original register context (e.g., using the information stored in Instrumentation Table 150), the original instruction, and code 32', 32", etc., to redirect 96', 98' (FIG. 14) execution to the address following the original instruction(s).
6) Allocate memory from the scratchpad buffer 34', 34", etc., of the size determined in step 5.
7) Allocate additional memory for each instance of the variable/structure that is to be captured in the trace buffer 103, of a size sufficient to hold the original (replaced) instruction, the code to save/restore the context of the return address, a program flow change instruction (30', 30", etc.) to branch to the code that captures the data in the trace buffer, and a program flow change instruction (32', 32", etc.) to return to program execution on the address following the original instruction.
8) Insert the trace acquisition code (from step 3) in the scratchpad memory allocated in step 6.
9) Insert the code described in step 5 into the scratchpad memory allocated in Step 6. Repeat this step for each instance of the variable that is identified by the debug information.
10) Modify (substitute, attach, etc.) the memory location(s) where the desired original instruction(s) reside to contain the program flow change instruction 30', 30", etc., to vector program execution to the start address of the newly allocated code space within the scratchpad memory.

Example 4 the following Example 4 is similar to Example 3 hereinabove, with additional assignments of the variable 'global_struct_1'. Sample Code Listing 6A shows the executable code 28" with modifications performed to facilitate the capture of the variable modifications in the trace buffer 103 (i.e., to effect step 3 of Table 6 above).

Sample Code Listing 6B shows the routine 35" used to effect these changes to code 28". For purposes of the example, the scratchpad buffer 34" starts in memory at 0x00200000, and routine 35' is the first memory allocation, so the routine 35' begins at address 0x00200000.

Sample Code Listing 6A

```
                                                515   # MY_STRUCT reference_function(int *parameter1,
                                                        char *paramecer2)
                                                516   # {
                                                517
                                                518   #$$bf
                                                519        .align           2
                                                520        .globl           reference_function
                                                521   reference_function:
            000000ee 03    0000 0044 ffff       605        .dlline          68
            000000f4 03    0000 0150
            00000150 00    9421 ffe8            606        stwu             r1,-24(r1)
            00000154 00    7c08 02a6            607        mfspr            r0,lr
                                                608   #$$br
            00000158 00    93c1 0010            609        stw              r30,16(r1)
            0000015c 00    93e1 0014            610        stw              r31,20(r1)
                                                611   #$$er
            00000160 00    9001 001c            612        stw       r0,28(r1)
                                                613   #$$ee
            00000164 00    7c7f 1b78            614        mr         r31,r3
            00000168 00    7c9e 2396            615        mr         r30,r4
                                                616   #    MY_STRUCT local_struct;
                                                617   #
                                                618   #       local_struct.integer_value = parameter1;
            000000f8 03    0000 0047 ffff       619   .L51:
            000000fe 03    0000 016c            620        .dlllna          71
            0000016c 00    819f 0000            621        lwz              r12,0(r31)
            00000170 00    9181 0008            622        stw              r12,8(r1)
                                                623   #       local_struct.char_value = *parameter2;
            00000102 03    0000 0048 ffff       624        .dlline   72
            00000108 03    0000 0174
            00000174 00    897a 0000            625        lbz              r11,0(r30)
            00000178 00    9961 000c            626        stb              r11,12(r1)
                                                627   #       global_struct_1.integer_value = parameterl;
            0000010c 03    0000 0049 ffff       628        .dlline          73
            00000112 03    0000 017c
            0000017c 00    815f 0000            629        lwz              r10,0(r31)
```

-continued

| | | | | | |
|---|---|---|---|---|---|
|  | 00000180 00 | 4821 0004 | 630 | bl | 0x210004 |
| | | | 631 | # | |
| | | | 632 | # return(local_struct); | |
| | 000000116 03 | 0000 004b ffff | 633 | .dlline | 75 |
| | 00000011c 03 | 0000 0184 | | | |
|  | 00000184 00 | 3961 0008 | 634 | addi | r11,r1,8 |
| | 00000188 00 | 806b 0000 | 635 | lwz | r3,0(r11) |
| | 0000018c 00 | 808b 0004 | 636 | lwz | r4,4(r11) |
| | | | 637 | # } | |
| | 00000120 03 | 0000 004c ffff | 638 | .dlline | 76 |
| | 00000126 03 | 0000 0190 | | | |
| | | | 639 | #$$be | |
| | | | 640 | #$$br | |
| | 00000190 00 | 83c10010 | 641 | lwz | r30,16(r1) |
| | 00000194 00 | 83e1 0014 | 642 | lwz | r31,20(r1) |
| | | | 643 | #$$er | |
| | 00000198 00 | 8001 001c | 644 | lwz | r0,28(r1) |
| | 0000019c 00 | 7c08 03a6 | 645 | mtspr | 1r,r0 |
| | 000001a0 00 | 3821 0018 | 646 | addi | r1,r1,24 |
| | | | 647 | #$$t1 0x18 0x0 | |
| | 000001a4 00 | 4e80 0020 | 648 | blr | |
| | | | 649 | #$$ef | |
| | | | 650 | .L50: | |
| | | | 651 | .section | .debug |
| | | | 652 | .L58: | |
| | 0000035f 02 | 0000 0004 | 653 | .4byte | 0x4 |
| | | | 654 | .previous | |
| | | | 655 | .type | reference_function,@function |
| | | | 656 | .size | reference_function,.-feference_function |
| | | | 657 | | |
| | | | 658 | # Allocations for reference_function | |
| | | | 659 | # c31 parameter1 | |
| | | | 660 | # r30 parameter2 | |
| | | | 661 | # SP,8 local_struct | |
| | | | 662 | # MY_STRUCT value_function(int parameter1, char parametar2 | |
| | | | 663 | # { | |
| | | | 664 | | |
| | | | 665 | #$$b6 | |
| | | | 666 | .align | 2 |
| | | | 667 | .globl | value_function |
| | | | 668 | value_function: | |
| | 0000012a 03 | 0000 004f ffff | 748 | .dlline | 79 |
| | 00000130 03 | 0000 01a8 | | | |
| | 000001a8 00 | 9421 ffe8 | 749 | stwu | r1,-24(r1) |
| | 000001ac 00 | 7c08 02a6 | 750 | mfspr | r0,1r |
| | | | 751 | #$$br | |
| | 000001b0 00 | 93c1 0010 | 752 | stw | r30,16(r1) |
| | 000001b4 00 | 93e1 0014 | 753 | stw | r31,20(r1) |
| | | | 754 | #$$er | |
| | 000001b8 00 | 9001 001c | 755 | stw | r0,28(r1) |
| | | | 756 | #$$ee | |
| | 000001bc 00 | 7c7f 1b78 | 757 | mr | r31,r3 |
| | 000001c0 00 | 7c9e 2378 | 758 | mr | r30,r4 |
| | | | 759 | # MY_STRUCT local_struct; | |
| | | | 760 | # | |
| | | | 761 | # local_struct.integer_value = parameter1; | |
| | | | 762 | .L64: | |
| | 00000134 03 | 0000 0052 ffff | 763 | .dlline | 82 |
| | 0000013a 03 | 0000 01c4 | | | |
| | 000001c4 00 | 93e1 0008 | 764 | stw | r31,8(r1) |
| | | | 765 | # local_struct.char_value = paramater2; | |
| | 0000013a 03 | 0000 0053 ffff | 766 | .dlline | 83 |
| | 00000144 03 | 0000 01c8 | | | |
| | 000001c8 00 | 9bc1 000c | 767 | stb | r30,12(r1) |
| | | | 768 | # global_struct_1 = local_struct; | |
| | 00000148 03 | 0000 0054 ffff | 769 | .dlline | 84 |
| | 0000014e 03 | 0000 01cc | | | |
| | 000001cc 00 | 3960 0000 | 770 | addi | r11,r0,global_struct_1@sdarx |
| | 000001d0 00 | 3951 0005 | 771 | addi | r12,r1,8 |

-continued

```
           000001d4 00    812c 0000         772        lwz         r9,0(r12)
           000001d8 00    814c 0004         773        lwz         r10,4(r12)
           000001dc 00    912b 0000         774        stw         r9,0(r11)

C ←        000001e0 00    4821 0200         775        bl          0x210200

776        #
                                            777        #    return(local_struct);
           00000152 03    0000 0056 ffff    778        .dlline     86
           00000158 03    0000 01e4

D →        000001e4 00    3961 0008         779        addi        r11,r1,8

000001e8 00    806b 0000         780        lwz         r3,0(r11)
           000001ec 00    808b 0004         781        lwz         r4,4(r11)
                                            782        # }
           0000015c 03    0000 0057 ffff    783        .dlline     87
           00000162 03    0000 01f0
                                            784        #$$be
                                            785        #$$br
           000001f0 00    83c1 0010         786        lwz         r30,16(r1)
           000001f4 00    83e1 0014         757        lwz         r31,20(r1)
                                            755        #$$er
           000001f8 00    8001 001c         789        lwz         r0, 28(r1)
           000001fc 00    7c08 03a6         790        mtspr       lr,r0
           00000200 00    3821 0018         791        addi        r1,r1,24
                                            792        #$$t1 0x18 0x0
           00000204 00    4e80 0020         793        blr
                                            794        #$$ef
                                            795        .L63:
                                            796        .section    .debug
                                            797        .L71:
           0000041d 02    0000 0004         798        .4byta      0x4
                                            799        .previous
                                            800        .type       value_function,@function
                                            801        .size       value_function,.-
value_function
                                            802
                                            803        # Allocations for value_function
                                            804        #    r31         parameter1
                                            805        #    r30         parameter2
                                            806        #    SP,8        local_struct
                                            807        # int add_values_reference(MY_STRUCT *structure1,
MY_STRUCT *structure2)
```

Sample Code Listing 6B

```
E →       0x00200000      ; Our code to capture the data structure information and
          0x00200004      ; pass it to be the trace buffer
          0x00200008      ;
                  .
                  .
                  .
F →       0x00210000      4e80 0020    blr A →       0x00210004      9140 0000
          0x00210008      ; Code to save enough of the context to allow us to
          0x0021000A      ; return to the address following the original opcode
          0x0021000C      ; address.
                  .
                  .
                  .
E ←       0x00210100      4820 0000    blr    200000

F →       0x00210104      ; code to restore the context to allow us to return
                  .
                  .
B ←       0x002101FC      4e80 0020    blr A1 →      0x00210200      914B 0004    stw    r10,4(r11)
          0x00210204      ; Code to save enough of the context to allow us to
          0x0021020A      ; return to the address following the original opcode
          0x0021020C      ; address.
                  .
                  .
                  .
E ←       0x00210300      4820 0000    blr    200000
```

-continued

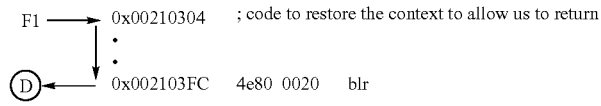

As shown, code segment "E" (beginning on line 0x00200000 and continuing to 0x00210000) is trace acquisition code (e.g., selected in Step 3 of Table 6 hereinabove) within routine 35". This code segment transfers a specific data structure (e.g., associated with an instance of the desired variable) into the buffer 103. The code segment "A" (beginning at line 2x00210004 and continuing to 0x00210100) saves register context, etc., (e.g., Step 4 of Table 6 hereinabove) for a specific usage of the data structure in the code 28". Code Segment "F" serves to restore the original code 28", if desired. (A discrete instance of code segments "A" and "F", such as shown as segments "A1" and "F1", may thus be included for each instance of the desired variable found in code 28".)

In operation, code 28" (Code Listing 6A) executes until an instance of the desired variable (e.g., global_struct_1) is found, such as at line 627, at which point a program flow change instruction is substituted (e.g., at line 630) which branches execution to code segment "A" (line 0x00210004) of routine 35" (Code Listing 6B). Subsequent lines of segment "A" are executed (e.g., to save context for "undo") until line 0x00210100 branches execution to code segment "E" (line 0x00200000). Execution of "E" continues (e.g., which serves to trace data) until line 0x00210000 branches execution to code segment "F" beginning on line 0x00210104. Segment "F" serves to restore code 28" (i.e., to 'undo' the instrumentation) if desired. Execution of segment "F" continues until line 0x002101FC branches execution back to code 28" at a point subsequent to the original branch to "A" (e.g., to line 634, shown as "B" in Code Listing 6A).

Code 28" then continues to execute until another instance of the desired variable (e.g., global_struct_1) is found, such as at line 768. As shown, the variable uses a different register than that used in the previous instance. For this reason, instead of again branching to code segment "A", the program flow change instruction substituted at line 775 branches execution to code segment "A1" (beginning on line 0x00210200 of routine 35"), which then branches to segment "E", followed by segment "F1". Segments "A1" and "F1" are executed in a manner similar to that described for segments "A" and "F" above.

The structure illustrated in this example advantageously allows multiple instances of segments "A", "A1", etc., ('store context') and "F", "F1", etc., ('restore code') to exist, such as to accommodate instances in which the variable of interest uses different registers to access the data. These multiple instances, in turn, provide a predetermined, uniform call structure that is conveniently receivable by a single instance of code segment "E" to transfer the data to buffer 103. This aspect nominally eliminates the need to repeat code segment "E" for each instance of the variable being traced. Thus, for a given amount of memory in the scratchpad, this embodiment permits instrumentation of a relatively greater number of instances of the desired variable. Advantageously, this approach tends to save considerable space when capturing variable/structure modification across many different functions in the code 28".

In light of the foregoing, various additional features may be provided by embodiments of the present invention. For example, in addition to the code modifications and insertions described hereinabove, it also may be desirable to identify the type of information that is being inserted into the trace (i.e., into the output to trace buffer 103). Normally the trace includes instructions and data associated with the instructions. With a particular embodiment of the present invention as described hereinabove, a particular instruction (i.e., source code or opcode) and its associated address may not necessarily appear in the trace. As such, it may be desirable to also insert information to identify the distinction between code and data. Moreover, for data, an embodiment of the present invention may provide sufficient information in the trace to allow the host system to determine which data values are represented so the information can be displayed in a format that is easily interpreted. In order to accomplish this, instrumentation module 12' may maintain a history of data values that are within the instrumentation routine 35', 35", etc., and derive a unique identifier for each data value that will appear in the trace buffer 103 to facilitate translation of the data into a desired format. The format information for the data is typically contained within the debug information of the application.

The identification of address verses data in the acquired trace may be performed by an extra delimiter value inserted for each operation (instruction branch, or data write) along with the information. Multiple operations of similar type may be associated with a single delimiter. Multiple instruction branch indications may be associated with a single "code" delimiter to save space in the trace buffer. Multiple data values may vary from this model due to the fact that each variable may need to be uniquely identified. In the case of data, there may be a "data" delimiter for each variable in the trace with multiple data values within a structure identified under a single data delimiter. This approach may advantageously serve to reduce the amount of delimiter data required in the trace to convey the information to the host program.

Having thus described the invention, what is claimed is:

1. A computer-implemented method for monitoring data and changing a behavior of a run time execution of software code in a target system, said method comprising:
    (a) searching a range of addresses within the software code to identify a desired instruction;
    (b) replacing the desired instruction with a program flow change instruction directing execution to a buffer, wherein the program flow change instruction is configured to change the behavior relative to that of the desired instruction, of the run time execution of the software code; and
    (c) inserting a routine into the buffer, the routine having an output instruction and a branch instruction branching to an address of the software code subsequent to the program flow change instruction, wherein the routine comprises a cache disabling instruction and a cache re-enabling instruction.

2. The method of claim 1, wherein the output instruction generates output to a trace buffer.

3. The method of claim 2, wherein the trace buffer is disposed on the target system.

4. The method of claim 1, comprising storing information in an instrumentation table to undo said replacing (b) and said inserting (c).

5. The method of claim 4, wherein the instrumentation table is disposed on a host system communicably coupled to the target system.

6. The method of claim 4, wherein said storing comprises storing the desired instruction, address of the desired instruction, action to be performed by the program flow change instruction, address of the buffer, size of the routine, and an identifier associated with the action to be performed.

7. The method of claim 1, wherein the target system includes a cache and at least a portion of the software code executes externally of the cache.

8. The method of claim 1, wherein the target system includes a bus and at least a portion of software code executes on the bus.

9. The method of claim 1, wherein said searching (a) further comprises searching for a plurality of desired instructions.

10. The method of claim 1, wherein said searching (a) comprises searching for a desired instruction disposed at the beginning of a program function.

11. The method of claim 10, wherein the desired instruction comprises a Move From Special Register instruction.

12. The method of claim 10, wherein said searching (a) comprises searching for an other desired instruction disposed at the ending of a program function.

13. The method of claim 12, wherein the other desired instruction comprises a Move to Special Register instruction.

14. The method of claim 1, wherein said searching (a) comprises searching for at least one desired instruction associated with data manipulation.

15. The method of claim 1, wherein the cache disabling instruction includes a Data Cache-disabling instruction.

16. The method of claim 1, wherein the cache disabling instruction includes an Instruction Cache-disabling instruction.

17. The method of claim 1, wherein said searching (a) comprises searching for a branch instruction, and searching for the desired instruction in a portion of the software code indicated by the branch instruction, the desired instruction being disposed outside of the range of addresses identified.

18. The method of claim 1, wherein the desired instruction comprises an EABI instruction.

19. The method of claim 1, wherein the searching (a) comprises using debug information to identify the desired instruction.

20. The method of claim 19, wherein the searching (a) comprises using complier-derived debug information in a format selected from the group consisting of stabs, elf, and dwarf formats.

21. The method of claim 1, wherein the program flow change instruction comprises an instruction to read from an odd address.

22. The method of claim 21, wherein to program flow change instruction comprises an instruction to add an odd integer to an address.

23. The method of claim 22, wherein the routine has a decoding instruction to identify the odd integer and execute an instruction corresponding thereto.

24. The method of claim 1, comprising a plurality of program flow change instructions corresponding to a plurality of user-selectable operations.

25. The method of claim 24, wherein each of said plurality of user-selectable operations is selected from the group consisting of:
  indicating entry and exit of a function;
  indicating entry and exit of a function and tracing execution of a function;
  indicating entry and exit of a function, tracing execution of the function, and indicating entry and exit and tracing execution of other function called by the function;
  indicating Entry and Exit of a function, tracing execution of the function, and indicating Entry and Exit without tracing execution of other functions called by the function;
  indicating data manipulation;
  inserting patch code into a code portion;
  inserting the sequence of program execution; and
  indicating changes to variables.

26. The method of claim 25, wherein said inserting (c) comprises:
  (i) selecting at least one output code statement to perform a selected one of said user-selectable operations;
  (ii) saving a copy of the output code statement and the desired instruction;
  (iii) determining the size of the output code statement, the branch instruction, the desired instruction, and restore code to restore the desired instruction;
  (iv) allocating memory in the buffer of the size determined in (iii); and
  (v) inserting the output code statement, the branch instruction, the desired instruction, and restore code, into the allocated memory.

27. The method of claim 26, wherein said saving (ii) comprises saving a copy of the program flow change instruction and the desired instruction in a translation table.

28. The method of claim 26, wherein said selecting (i) comprises analyzing a symbol table of the software code.

29. The method of claim 26, wherein said selecting (i) comprises calling a function selected from the group consisting of a printf or scanf function.

30. The method of claim 26, wherein the restore code comprises code to save and restore original register contexts.

31. The method of claim 25, wherein said searching (a) comprises identifying addresses in the program code that are associated with each instance of a modification of an identified variable/structure, and locating a final instruction for each instance of a modification, to final instruction being said desired instruction.

32. The method of claim 31, wherein said inserting (c) comprises:
  (i) selecting at least one output code statement to transfer data to the buffer;
  (ii) saving a copy of the output code statement and the desired instruction;
  (iii) determining the size of the output code statement, the desired instruction, and restore code to restore the desired instruction;
  (iv) allocating memory in the buffer of the size determined in (iii), and to run the trace acquisition code; and
  (v) inserting the output code statement, the branch instruction, the desired instruction, and restore code, into the allocated memory.

33. The method of claim 32, wherein said allocating (iv) further comprises allocating additional memory of the size determined in (iii) for each said instance of a modification of an identified variable/structure.

34. The method of claim 33, further comprising repeating said inserting (v) for each said instance.

35. The method of claim 32, wherein said saving (ii) comprises saving a copy of the program flow change instruction and the desired instruction in a translation table.

36. The method of claim 32, wherein said selecting (i) comprises analyzing a symbol table of the software code.

37. The method of claim 32, wherein said selecting (i) comprises calling a function selected from the group consisting of a printf or scanf function.

38. The meted of claim 32, wherein the restore code comprises code to save and restore original register contexts.

39. The method of claim 1, further comprising reversing said replacing (b), and inserting (c), to restore the software code.

40. The method of claim 1. wherein at least one of said searching (a), replacing (b), and inserting (c) is performed during run time execution of the software code.

41. The method of claim 40, wherein at least one of said searching (a), replacing (b), and inserting (c) is performed after the software code is compiled.

42. The method of claim 41, wherein execution of the software code is halted during performance of said at least one of said searching (a), replacing (b), and inserting (c).

43. The method of claim 1, comprising executing the software code.

44. A computer-implemented method for monitoring data and changing a behavior of a run time execution of software code in a target system, said method comprising:
    searching a range of addresses within the software code using debug information to identity a desired instruction;
    replacing the desired instruction with a program flow change instruction directing execution to a buffer, wherein the program flow change instruction is configured to change the behavior, relative to that of the desired instruction, of the run time execution of the software code; and
    inserting a routine into the buffer, the routine having a branch instruction branching to an address of the software code subsequent to the program flow change instruction, wherein the routine comprises a cache disabling instruction and a cache re-enabling instruction.

45. A computer-implemented system for monitoring data and changing a behavior of a run time execution of software code in a target system, said system comprising:
    an instruction locating module configured to search a range of addresses within the software code to identity a desired instruction;
    an instruction replacement module configured to replace the desired instruction with a program flow change instruction directing execution to a buffer, wherein the program flow change instruction is configured to change the behavior, relative to that of the desired instruction, of the run time execution of the software code; and
    an instrumentation module configured to insert a routine into the buffer, the routine having an output instruction and a branch instruction branching to an address of the software code subsequent to the program flow change instruction, wherein the routine comprises a cache disabling instruction and a cache re-enabling instruction.

46. A computer-implemented system for monitoring data and changing a behavior of a run time execution of software code in a target system, said system comprising:
    an instruction locating module configured to search a range of addresses within the software code using debug information to identify a desired instruction;
    an instruction replacement module configured to replace the desired instruction with a program flow change instruction directing execution to a buffer, wherein the program flow change instruction is configured to change the behavior, relative to that of the desired instruction, of the run time execution of the software code; and
    an instrumentation module configured to insert a routine into the buffer, the routine having a branch instruction branching to an address of the software coda subsequent to the program flow change instruction, wherein the routine comprises a cache disabling instruction and a cache re-enabling instruction.

47. An article of manufacture for monitoring data and changing a behavior of a run time execution of software code in a target system, said article of manufacture comprising:
    a computer usable medium having computer readable program code embodied therein, said computer usable medium having:
    computer readable program code for searching a range of addresses within the software code to identify a desired instruction before or after execution thereof;
    computer readable program code for replacing the desired instruction with a program flow change instruction directing execution to a buffer, wherein the program flow change instruction is configured to change the behavior, relative to that of the desired instruction, of the run time execution of the software code; and
    computer readable program code for inserting a routine into the buffer, the routine having an output instruction and a branch instruction branching to an address of the software code subsequent to the program flow change instruction, wherein the routine comprises a cache disabling instruction and a cache re-enabling instruction.

48. Computer readable program code embodied in a computer usable medium for monitoring data and changing a behavior of a run time execution of software code in a target system, said computer readable program code comprising:
    computer readable program code for searching a range of addresses within the software code to identify a desired instruction;
    computer readable program code for replacing the desired instruction with a program flow change instruction directing execution to a buffer, wherein the program flow change instruction is configured to change the behavior, relative to that of the desired instruction, of the run time execution of the software code; and
    computer readable program code for inserting a routine into the buffer, the routine having an output instruction and a branch instruction branching to an address of the software code subsequent to the program flow change instruction, wherein the routine comprises a cache disabling instruction and a cache re-enabling instruction.

* * * * *